(12) United States Patent
Graham et al.

(10) Patent No.: US 12,239,917 B2
(45) Date of Patent: Mar. 4, 2025

(54) TRACK FOR ROLLING VEHICLE AND METHODS OF FABRICATING AND ASSEMBLING THE TRACK

(71) Applicant: The Gravity Group, LLC, West Chester, OH (US)

(72) Inventors: Michael A. Graham, Loveland, OH (US); Chad M. Miller, West Chester, OH (US); Korey T. Kiepert, West Chester, OH (US); Lawrence R. Bill, Cincinnati, OH (US); Jonathan S. Wocher, Cincinnati, OH (US); Brian M. Kosmac, Maineville, OH (US)

(73) Assignee: The Gravity Group, LLC, West Chester, OH (US)

( * ) Notice: Subject to any disclaimer, the term of this patent is extended or adjusted under 35 U.S.C. 154(b) by 0 days.

(21) Appl. No.: 18/473,587

(22) Filed: Sep. 25, 2023

(65) Prior Publication Data
US 2024/0009579 A1 Jan. 11, 2024

Related U.S. Application Data

(63) Continuation of application No. 16/792,144, filed on Feb. 14, 2020, now Pat. No. 11,766,619.

(60) Provisional application No. 62/817,584, filed on Mar. 13, 2019, provisional application No. 62/805,952, filed on Feb. 14, 2019.

(51) Int. Cl.
*G05B 19/4097* (2006.01)
*A63G 7/00* (2006.01)
*A63G 21/04* (2006.01)
*B26F 1/00* (2006.01)
*A63G 21/20* (2006.01)
*B32B 15/01* (2006.01)
*E01B 23/04* (2006.01)

(52) U.S. Cl.
CPC ............... *A63G 7/00* (2013.01); *A63G 21/04* (2013.01); *B26F 1/0038* (2013.01); *A63G 21/20* (2013.01); *B32B 15/011* (2013.01); *E01B 23/04* (2013.01)

(58) Field of Classification Search
CPC .......... A63G 7/00; A63G 21/04; A63G 21/20; B26F 1/0038; B32B 15/011
See application file for complete search history.

(56) References Cited

U.S. PATENT DOCUMENTS

| 1,741,286 | A | * | 12/1929 | Church | A63G 7/00 104/63 |
| 3,583,327 | A | * | 6/1971 | Arndt | E01B 23/02 104/120 |
| 2011/0146528 | A1 | * | 6/2011 | Schilke | A63G 7/00 104/53 |
| 2021/0077913 | A1 | * | 3/2021 | Pike | A63H 19/36 |

* cited by examiner

*Primary Examiner* — Omar Flores Sanchez
(74) *Attorney, Agent, or Firm* — UB Greensfelder LLP; Matthew J. Schonauer

(57) ABSTRACT

A track for a roller coaster is provided. The track includes a plurality of layers that are each constructed from a plurality of layer segments prefabricated with an automated precision cutting device.

22 Claims, 16 Drawing Sheets

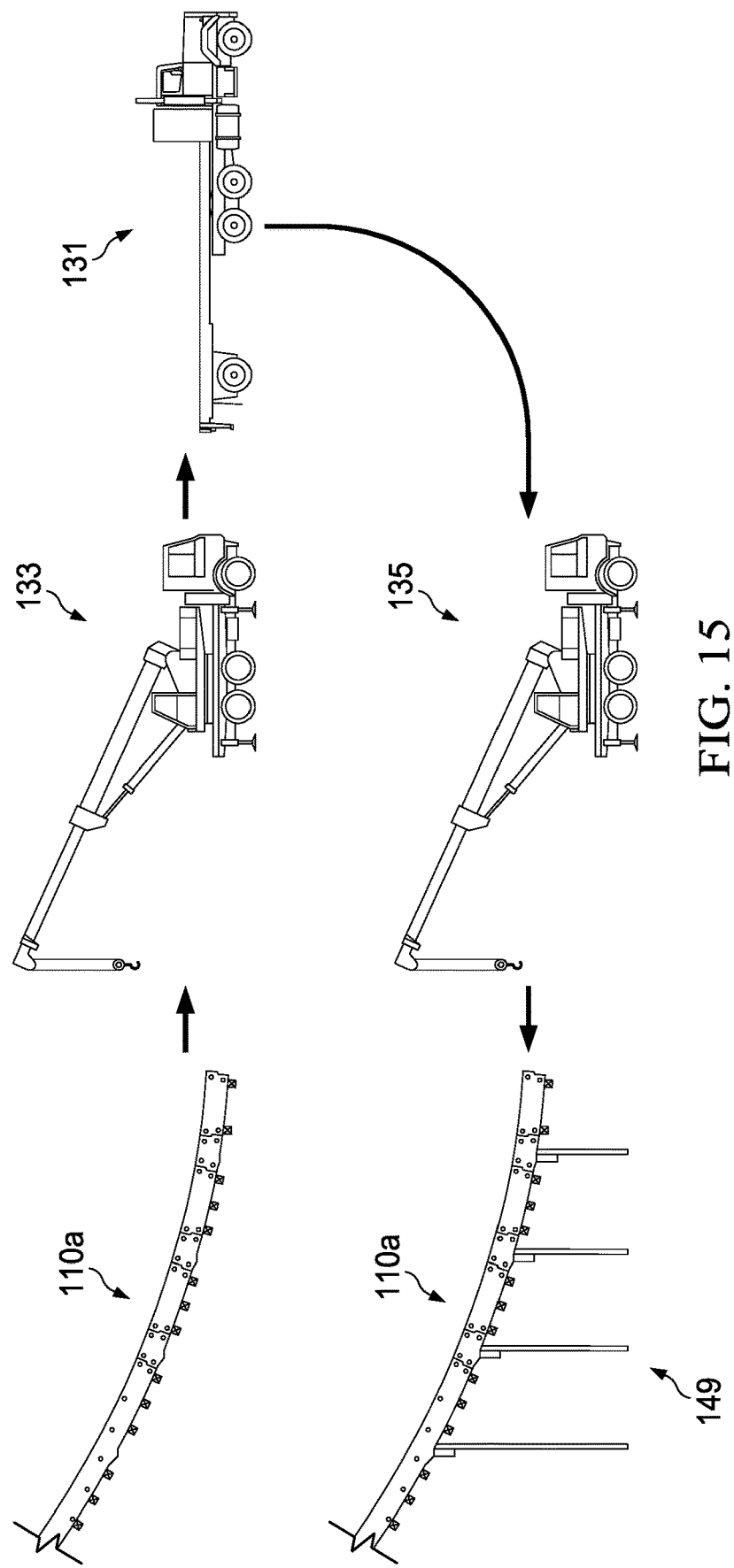

TRACK FOR ROLLING VEHICLE AND METHODS OF FABRICATING AND ASSEMBLING THE TRACK

REFERENCE TO RELATED APPLICATIONS

This application is a continuation of U.S. Non-Provisional patent application Ser. No. 16/792,144, filed Feb. 14, 2020, which claims priority to U.S. Provisional Patent Application Ser. No. 62/805,952, filed Feb. 14, 2019, and U.S. Provisional Patent Application Ser. No. 62/817,584, filed Mar. 13, 2019, each of which is hereby incorporated herein by reference in its entirety.

TECHNICAL FIELD

The apparatus and methods described below generally relate to a track for a rolling vehicle, such as a roller coaster. In particular, the track assembly includes multiple layers that are arranged in a stacked configuration to facilitate underlying support for a rolling vehicle.

BACKGROUND

Conventional wooden roller coaster track is typically formed by layering dimensional lumber and bending the layers in the "weak" direction (e.g., a direction substantially perpendicular to the depth of each layer of dimensional lumber to match the overall profile of the underlying structure. The layers are then manually cut in the "strong" direction (e.g., along the width of the dimensional lumber) to create a curved path for the ride vehicle. Bending and cutting the track in this manner can require repeated adjustment which be costly and time consuming and can still leave slight imperfections in the track that adversely affect a passenger's enjoyment and comfort. In addition, this type of track assembly can require highly skilled labor which can be scarce and expensive.

BRIEF DESCRIPTION OF THE DRAWINGS

Various embodiments will become better understood with regard to the following description, appended claims and accompanying drawings wherein:

FIG. 15 is a schematic view of a method for transporting the first track portion from a manufacturing facility to an amusement park;

DETAILED DESCRIPTION

Figure 1:
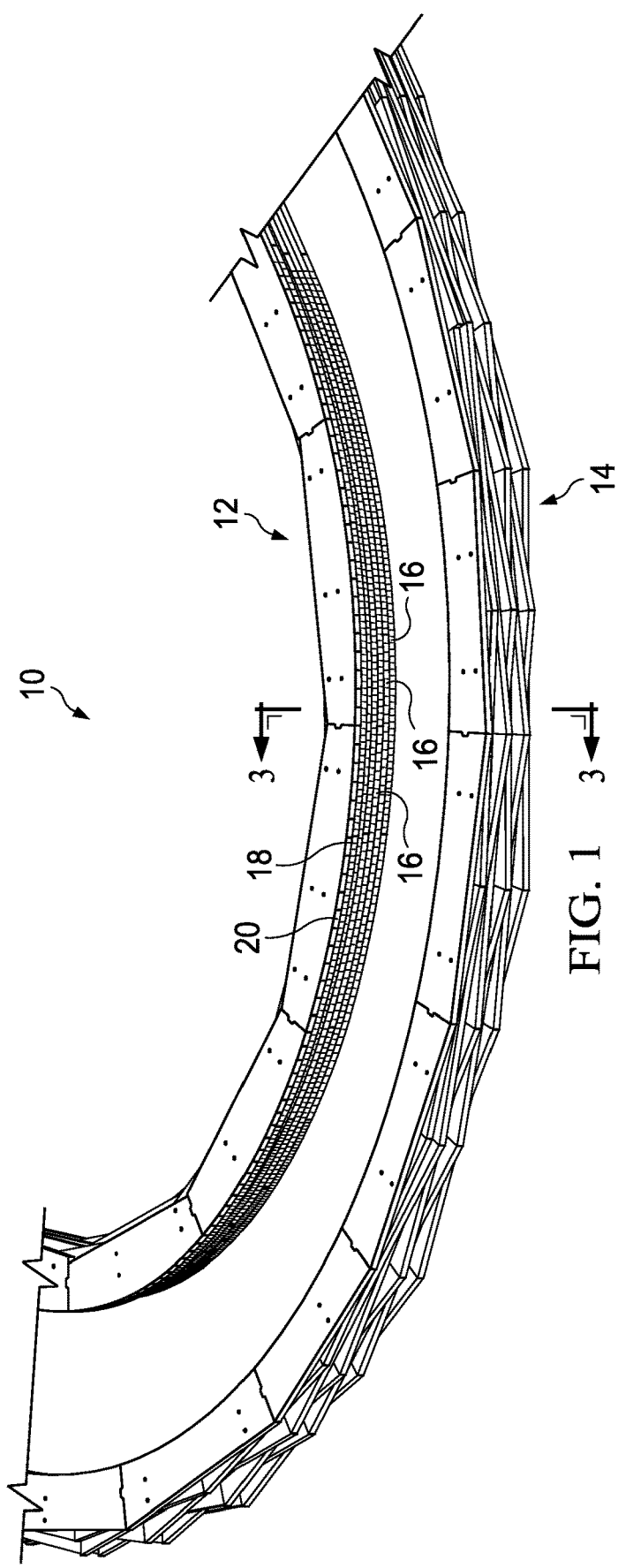
FIG. 1 is an upper isometric view depicting a horizontal track portion of a roller coaster track that comprises a right rail and a left rail, each right and left rail including a plurality of base layers, a lower track layer, and an upper track layer, in accordance with one embodiment.
Figure 2:
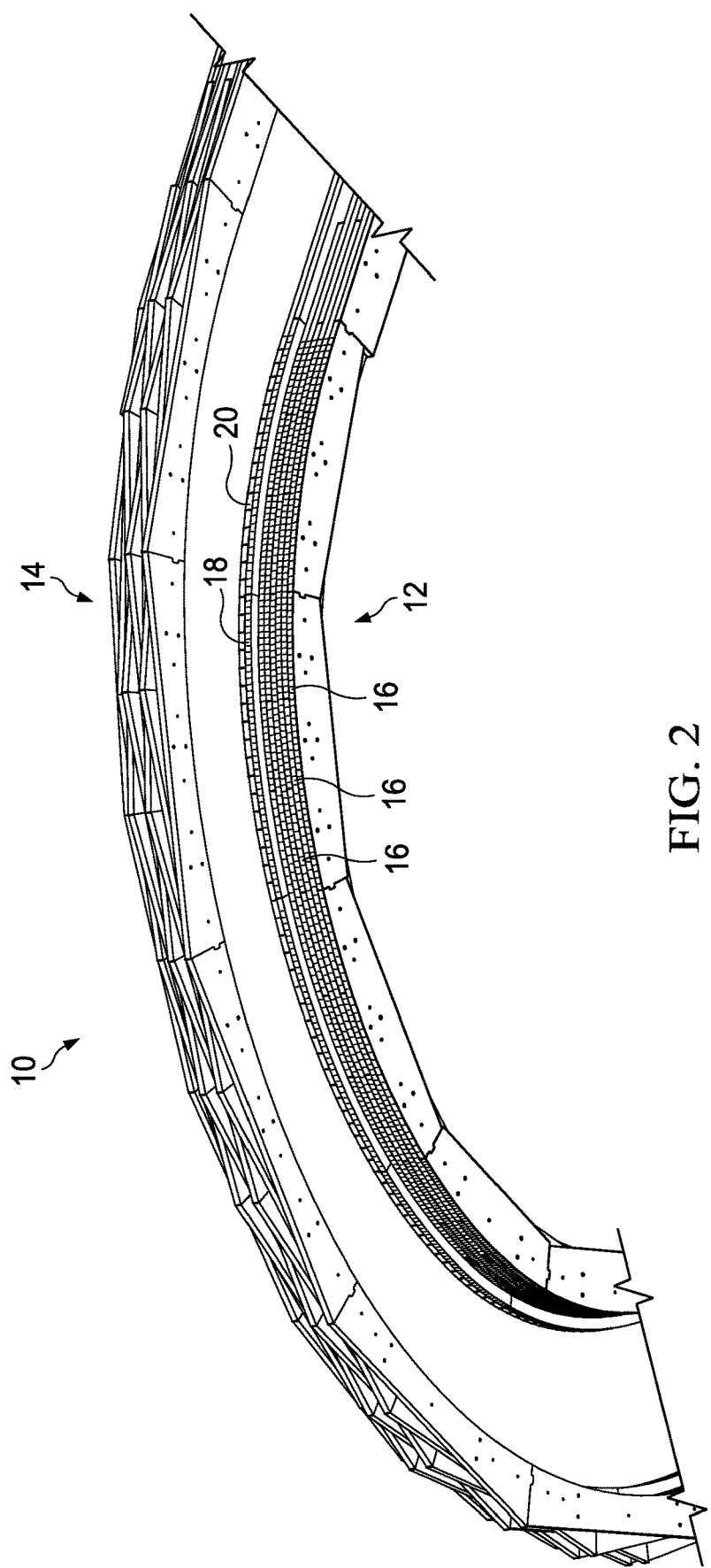
FIG. 2 is a lower isometric view depicting the right rail of the horizontal track portion of FIG. 1.
Figure 3:
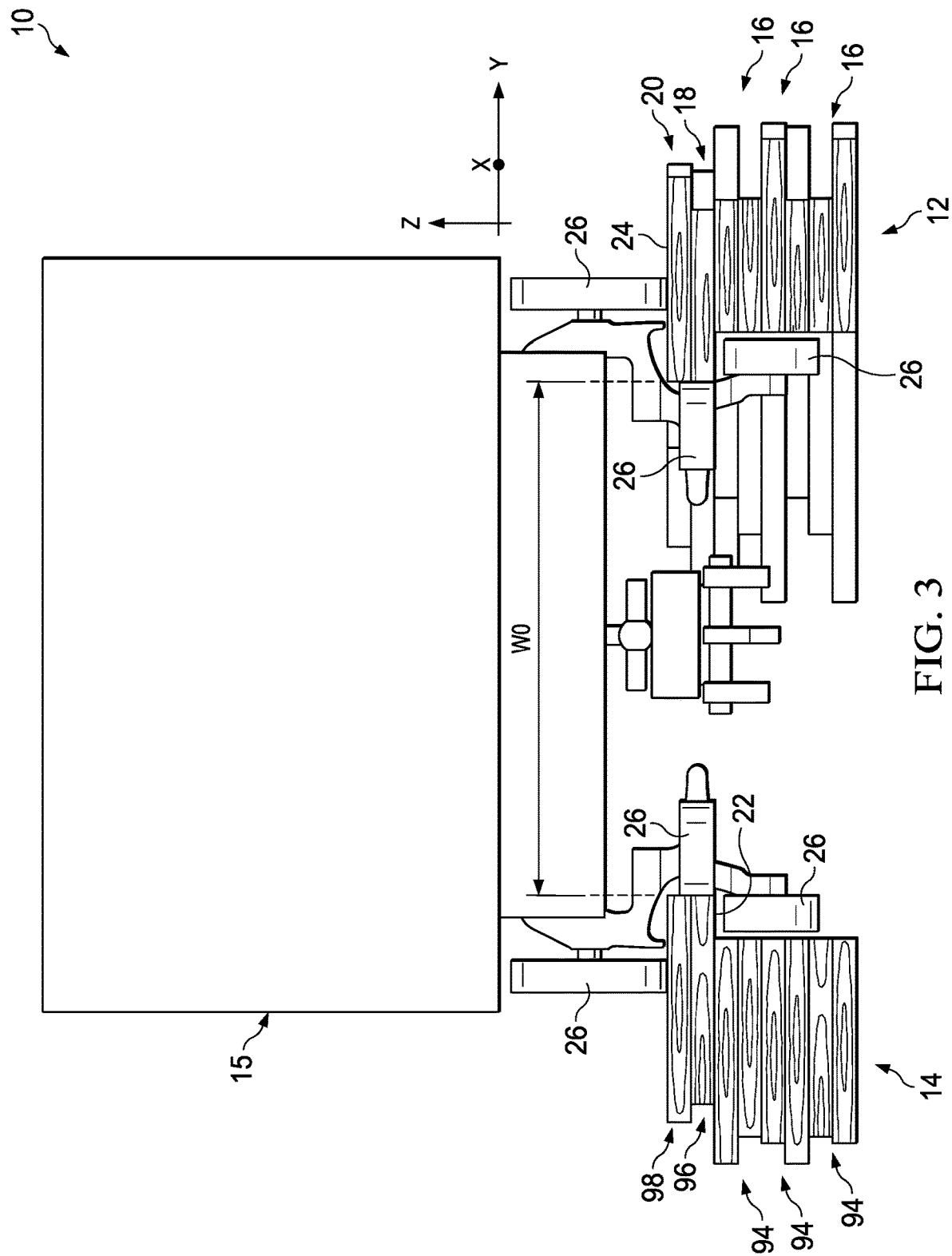
FIG. 3 is a section view taken along the line 3-3 in FIG. 1.

Embodiments are hereinafter described in detail in connection with the views and examples of FIGS. 1-27I, wherein like numbers indicate the same or corresponding elements throughout the views. A horizontal track portion 10 of a roller coaster track that defines a horizontal curve (e.g., a left/right turn) is generally depicted in FIGS. 1-3. The horizontal track portion 10 can include a right rail 12 and a left rail 14 that cooperate together to provide underlying support for a train car 15 (e.g., a ride vehicle) (see FIG. 3). The right rail 12 and the left rail 14 can be spaced from each other to define a track width W0. The right rail 12 can include plurality of base layers 16, a lower track layer 18, and an upper track layer 20. Each of the base layers 16, the lower track layer 18, and the upper track layer 20 can be arranged horizontally and stacked together such that the base layers 16 underlie the lower and upper track layers 18, 20, and the lower track layer 18 is sandwiched between the base layers 16 and the upper track layer 20.

The layers 16, 18, 20 can be formed of wood such that the roller coaster is considered to be a wooden roller coaster. In one embodiment, the layers 16, 18, 20 can be formed of weather-resistant wood (e.g., pressure treated wood) such as pine, for example. Each of the base layers 16, the lower track layer 18, and the upper track layer 20 can be secured to each other with fasteners, glue, and/or dowels, or with any of a variety of suitable alternative attachment methods.

The base layers 16 can cooperate together to provide an underlying support structure for the lower and upper track layers 18, 20. The lower and upper track layers 18, 20 can have respective interior portions 22, 24 that extend beyond the base layers 16 (e.g., in a cantilevered arrangement) for accommodating wheels 26 of the train car 15 (see FIG. 3). The lower and upper track layers 18, 20 can define a travel path for the train car 15. Running plates (not shown) can be provided on the top, sides, and bottom of the interior portions 22, 24 to provide a running surface (e.g., a contact surface) for the wheels 26 of the train car 15. In one embodiment, the running plates can be formed of plate steel.

Figure 4:
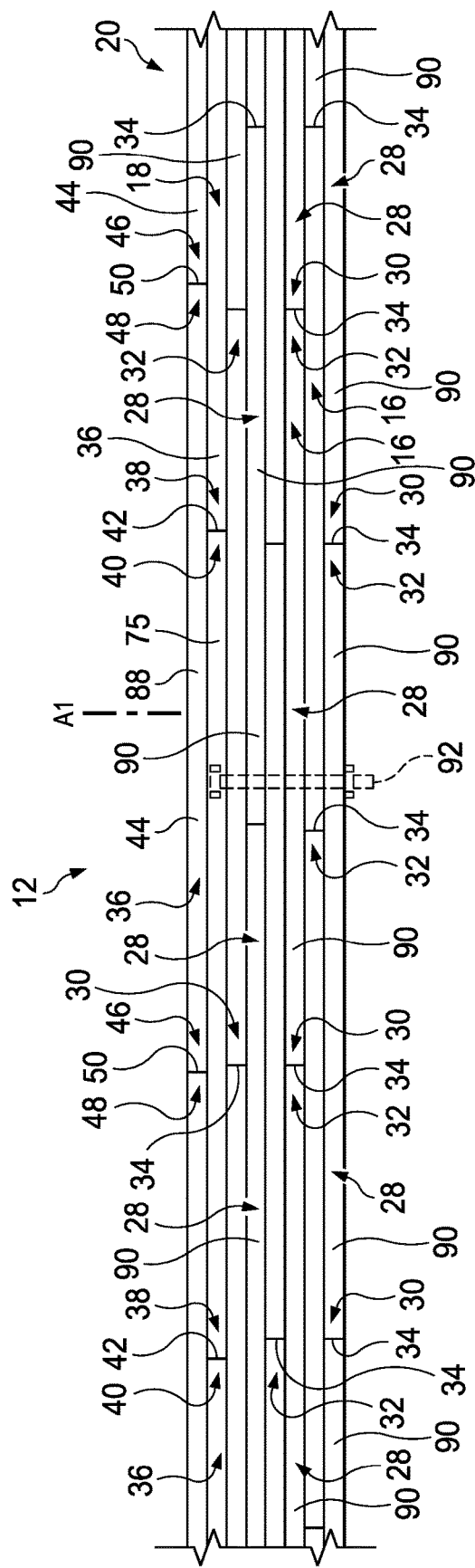
FIG. 4 is a front elevational view depicting the right rail of FIG. 1.

Each layer 16, 18, 20 of the horizontal track portion 10 can be constructed of a plurality of discrete layer segments that are each laid end-to-end and in a contacting relationship with longitudinally adjacent layer segment (e.g., parallel to a travel path of the train car 15). Referring now to FIG. 4, each of the base layers 16 are shown to include a plurality of base layer segments 28 that each have a first end 30 and a second end 32. The first end 30 of each base layer segment 28 can be in contact with the second end 32 of an adjacent base layer segment 28 at an interface location 34. The lower track layer 18 is shown to include a plurality of lower track layer segments 36 that each have a first end 38 and a second end 40. The first end 38 of each lower track layer segment 36 can be in contact with the second end 40 of an adjacent lower track layer segment 36 at an interface location 42. The upper track layer 20 is shown to include a plurality of upper track layer segments 44 that each have a first end 46 and a second end 48. The first end 46 of each upper track layer segment 44 can be in contact with the second end 48 of an adjacent upper track layer segment 44 at an interface location 50.

Figure 5:
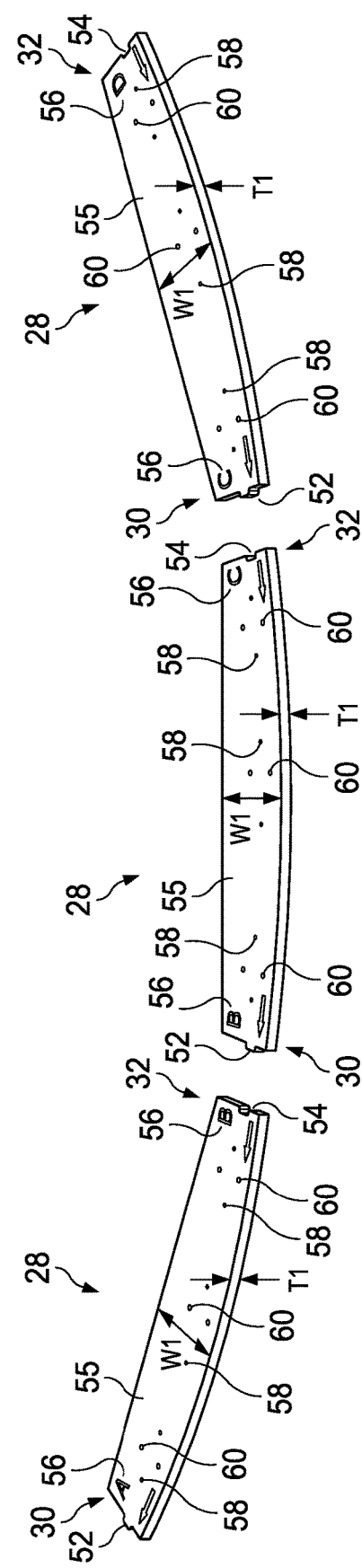
FIG. 5 is an exploded view depicting three base layer segments of the right rail of FIG. 1.

Referring now to FIG. 5, three of the base layer segments 28 are illustrated and will now be described. The first ends 30 of each base layer segment 28 can include a tab 52 and the second ends 32 of each base layer segment 28 can define a notch 54. When the base layer segments 28 are laid end-to-end (e.g., longitudinally adjacent) and in a contacting relationship with each other (as illustrated in FIG. 4), each tab 52 can extend into one of the notches 54 thus defining the interface location 34. The interaction between the notches 54 and the tabs 52 can resist relative horizontal movement between the base layer segments 28 as well as provide visual indicators that facilitate validation of the relative physical orientation of between the base layer segments 28. It is to be appreciated that the base layer segments 28 can have any of a variety of suitable alternative interlocking feature(s) disposed at the first end 30 and/or the second end 32 that facilitate lateral coupling between the base layer segments 28.

Each base layer segment 28 can have a thickness T1 and a width W1 that is greater than the thickness T1. Each of the base layer segments 28 can include an upper surface that extends along the width W1. The first and second ends 30, 32 can be provided with indicia 56 (e.g., lettering and numbering engraved into, or otherwise applied to, the upper surface that identifies which ends of the base layer segments 28 are to be matched together during assembly, as well as which side of the track the base layer segments 28 are meant for. The indicia 56 also can include an arrow indicating the direction of the travel path of the roller coaster to identify the longitudinal orientation of each base layer segment 28. It is to be appreciated that any of a variety of suitable alternative visual indicators (e.g., markings or engravings) can be used to validate the relative orientation of base layer segments 28 with respect to each other. Each of the base layer segments 28 can define a plurality of first vertical holes 58 and a plurality of second vertical holes 60. Dowels (not shown) or other fasteners can be provided through the first vertical holes 58 and into corresponding holes in the immediately adjacent base layer 16 to couple the base layers 16 together.

Figure 6:
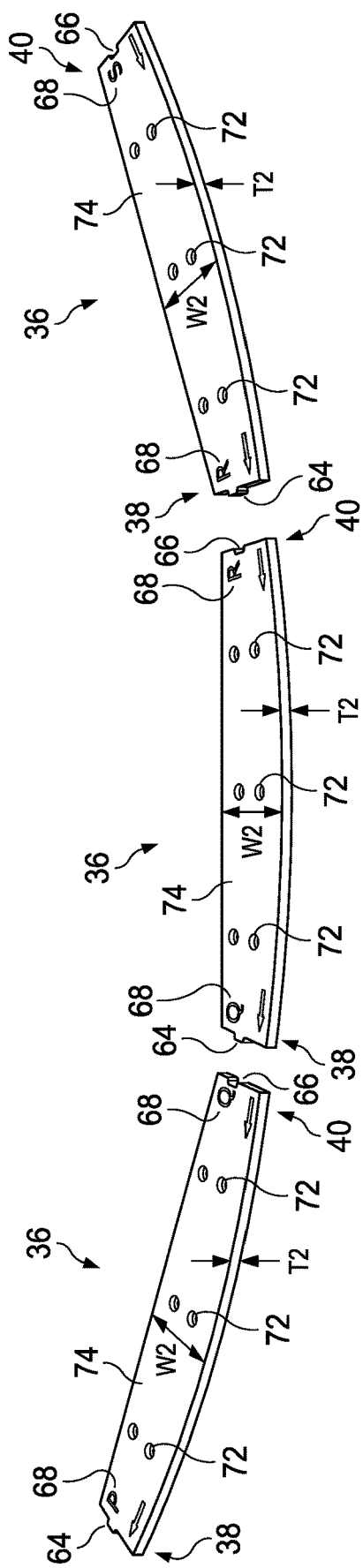
FIG. 6 is an exploded view depicting three lower track layer segments of the right rail of FIG. 1.

Referring now to FIG. 6, three of the lower track layer segments 36 are illustrated and are similar to, or the same in many respects as, the base layer segments 28 illustrated in FIG. For example, each of the lower track layer segments 36 can comprise a first end 38 and a second end 40. The first ends 38 can each include a tab 64 and the second ends 40 can each define a notch 66. The first and second ends 38, 40 can be provided with indicia 68. Each of the lower track layer segments 36 can define a plurality of second vertical holes 72. The lower track layer segments 36 can each have a thickness T2 and a width W2 that is greater than the thickness T2. Each of the lower track layer segments 36 can include an upper surface 74 that extends along the width W2 and an interior surface 76 that extends along the thickness T2. The width W2 of the lower track layer segment 36 can be wider than the width W1 of the base layer segments 28 such that the interior portion 22 (FIG. 3) of the lower track layer 18 overhangs the base layers 16.

Figure 7:
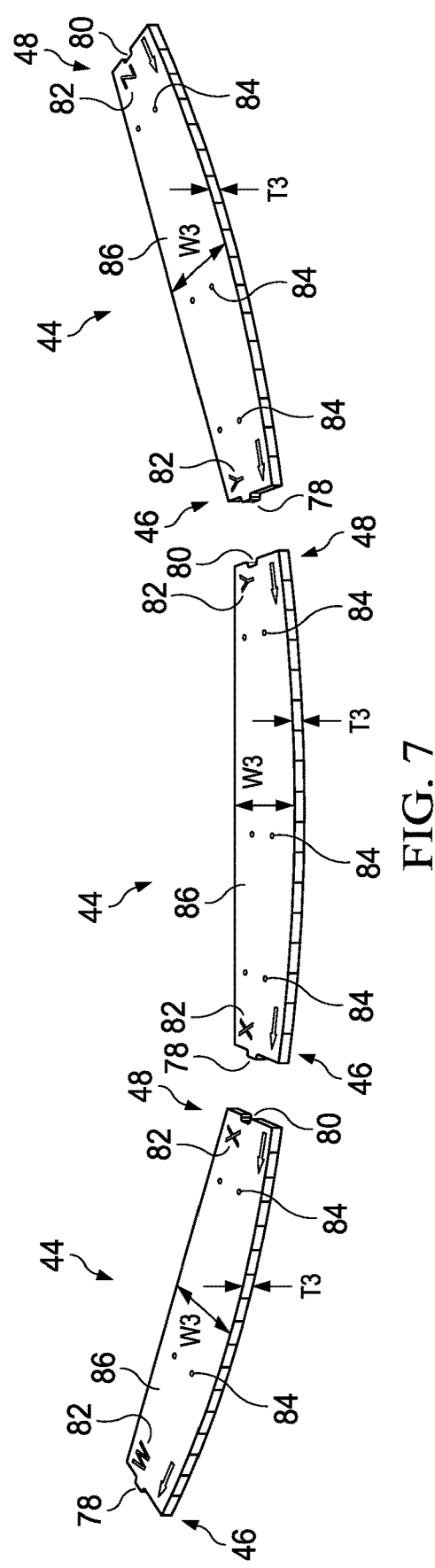
FIG. 7 is an exploded view depicting three upper track layer segments of the right rail of FIG. 1.

Referring now to FIG. 7, three of the upper track layer segments 44 are illustrated and are similar to, or the same in many respects as, the base layer segments 28 illustrated in FIG. For example, each of the upper track layer segments 44 can comprise a first end 46 and a second end 48. Each of the first ends 46 of can include a tab 78 and each of the second ends 48 define a notch 80. The first and second ends 46, 48 can be provided with indicia 82. Each of the upper track layer segments 44 can define a plurality of first vertical holes 84. Dowels (not shown) or other fasteners can be provided through the first vertical holes 84 and into corresponding holes in the immediately adjacent lower track layer 18 to couple the upper track layer 20 and the lower track layer 18 together. The upper track layer segments 44 can each have a thickness T3 and a width W3 that is greater than the thickness T3. Each of the upper track layer segments 44 can include an upper surface 86 that extends along the width W3 and an interior surface 88 (FIG. 4) that extends along the thickness T3. The width W3 of the upper track layer segment 44 can be wider than the width W1 of the base layer segments 28 such that the interior portion 24 (FIG. 3) of the upper track layer 20 overhangs the base layers 16.

Referring again to FIG. 4, the base layers 16, the lower track layer 18, and the upper track layer 20 can be arranged horizontally and stacked together such that each of the layers 16, 18, 20 are laterally (e.g., vertically) adjacent to one another (e.g., in a direction that is perpendicular to the direction of travel of the train car 15). The interior surfaces 76, 88 (FIG. 4) can define the overall contour of the right rail 12 (e.g., a gradual turn) for the roller coaster. Interior surfaces (e.g., 90) of the base layer segments 28 can be contoured to substantially follow the interior surfaces 76, 88 of the lower and upper track layers 18, 20 such that the base layers 16, the lower track layer 18, and the upper track layer 20 are similarly contoured along the length of the right rail 12. It is to be appreciated that the interior surfaces (e.g., 90) of the base layer segments 28 are horizontally spaced from the interior surfaces 76, 88 of the lower and upper track layers 18, 20 enough to prevent contact with the wheel assemblies of the train.

The base layers 16 and the lower track layer 18 can be arranged to align the first vertical holes 58 with the first vertical holes 70 and the second vertical holes 60 with the second vertical holes 72. Dowels (not shown) can be provided through the first vertical holes 58, 70 to couple the base layers 16 and the lower track layer 18 together. Bolts 92 (one shown in dashed lines) can be provided through the second vertical holes 60, 72 to facilitate securement of the base layers 16 and the lower track layer 18 together to an underlying structural member, such as a cross tie (not shown), for example. As illustrated in FIG. 6, the second vertical holes 72 of the lower track layer 18 can be counter bored or otherwise recessed to allow the bolts 92 to be nested within the second vertical holes 72 such that the bolts 92 do not obstruct attachment of the upper track layer 20 to the lower track layer 18.

Each layer 16, 18, 20 can be arranged such that the interface locations (e.g., 34, 42, 50) between each pair of layer segments for a given layer is longitudinally offset (e.g., along the travel path of the train car 15) from the interface locations of the laterally adjacent (e.g., overlying and/or underlying) layers. Each layer is accordingly positioned relative to the other laterally adjacent layers such that each layer segment overlaps (e.g., extends beyond) the laterally adjacent layer segment (e.g., disposed vertically above or beneath) to create a plurality of interface locations that are longitudinally offset from one another along the travel path of the train car. For example, as illustrated in FIG. 4, the interface locations 42 of the lower track layer 18 can be longitudinally offset from the interface locations 34 of the base layer 16 (e.g., the underlying layer) and from the interface locations 50 of the upper track layer 20 (e.g., the overlying layer). Offsetting the interface locations in this manner can distribute the weight of the train car 15 more evenly than conventional prefabricated arrangements that have discrete rail sections that are laid end-to-end and connected together (e.g., via bolts, welding, or adhesive) at a butt joint (e.g., where the interface locations are vertically aligned), a splice, or a similar single-point rail joint that requires shear braces or other shear reinforcement to connect the rail sections together. In one embodiment, each layer segment of the layers 16, 18, 20 can be arranged to overlap an underlying interface location by about one-third of the overall length of the layer segment. For example, for layer segments that are about six feet long, the layer segments can be arranged to overlap an underlying interface location by about two feet.

The base layers 16, the lower track layer 18, and the upper track layer 20 are shown to be arranged horizontally to form a horizontal curve (e.g., a left/right turn) of the horizontal track portion 10. It is to be appreciated that a layer that is described as being arranged horizontally can be understood to mean that the width (e.g., W1, W2, W3) of the layer can extend substantially parallel to the running surface of the roller coaster defined by the lower and upper track layers 18, 20.

It is to be appreciated that although the right rail 12 is shown to have six base layers, any quantity of base layers can be used (e.g., one, two, three, four, five or more than six base layers). It is also to be appreciated that although the right rail 12 is shown to have two track layers, any quantity of track layers can be used (e.g., one or more than two track layers).

The left rail 14 illustrated in FIGS. 1-3 can be understood to be similar to the right rail 12 described above, but instead configured for a left side of the horizontal track portion 10. For example, as illustrated in FIG. 3, the left rail 14 can include a plurality of base layers 94, a lower track layer 96, and an upper track layer 98. Each of the layers 94, 96, 98 can be formed by respective pluralities of layer segments. Each of the layer segments can include an interior surface that is configured to follow the contour of the horizontal track portion 10 defined by the right rail 12. Alternately, the track could be defined by a single rail, with track layers that extend beyond the base layers on both sides in order to accommodate a ride vehicle.

Each layer segment of the layers 16, 18, 20, 94, 96, 98 can be fabricated from an individual piece of dimensional finished lumber (e.g., common pre-milled wood stock provided from a mill in standard lengths, widths, and thicknesses) in a factory or other controlled environment prior to delivery and assembly of the track at a destination site (e.g., an amusement park). Each layer segment can be fabricated by cutting a precise shape out of the dimensional finished lumber that can include at least some of the features described above (e.g., an interior surface, holes, and/or interface features). The shape of the layer segment can form a predefined two-dimensional curve of the track. The layer segments can be cut from the dimensional finished lumber using a CNC machine or other automated precision cutting device, such as a laser cutter, a plasma cutter, or a water jet cutter.

Before each layer segment is prefabricated, a computer model of the horizontal track portion 10 can first be generated. The computer model can facilitate mapping of the shape and position of each layer segment that is to be used to construct the horizontal track portion 10. Each layer segment can then be cut using the parameters defined by the computer generated model. The horizontal track portion 10 can then be assembled from the precut layer segments. Since the shape and position of each layer segment is predefined by the computer model, the assembly of the horizontal track portion 10 can be more predictable than conventional construction methods. As a result, the construction of the horizontal track portion 10 can require less on-site manipulation than conventional arrangements which can reduce cost and inefficiencies and improve the overall quality of the horizontal track portion 10 as compared to these conventional construction methods.

For example, conventionally, wood roller coaster track is made by layering uncut structural lumber, bending that lumber in the weak direction, and then cutting a curved vehicle running surface in the strong direction by hand with power tools. Typically, it is necessary to stack multiple layers together before cutting the vehicle running surface in order to form the correct curve in the bent direction, as well as to match the path of the cut precisely between layers after that bending has occurred. This typically requires a highly skilled workforce (which can be scarce and expensive) and time-consuming repeated iterations to cut the board ends to ensure that each board is installed at the appropriate angle to maximize material usage while avoiding discontinuity or gaps between the boards. In addition, once the track has been initially constructed, the path and curve profile still needs to be fine-tuned by repeatedly detaching, repositioning, and reattaching the track to an underlying substructure until the path and curve profile is within an acceptable tolerance of the original engineering plans for the track.

By prefabricating the layer segments from a computer generated model and with an automated precision cutting device prior to assembly, the horizontal track portion 10 can be assembled at a destination site by simply assembling the layer segments in the order defined by the computer model. In some instances, the holes in each of the layer segments can be predrilled to ensure proper alignment among adjacent layer segments. As a result, the horizontal track portion can be more easily and more cost effectively assembled than conventional tracks and can provide a sturdier and more durable track without the need for a highly skilled labor force. In addition, since the proper curve shape of each layer segment is translated directly from the computer model to the other automated precision cutting device that is cutting the layer segments, the overall accuracy of the curve between adjacent layer segments can be maintained due to the consistent and repeatable cuts that are achievable with the automated precision cutting device.

It is to be appreciated that the layer segments can be modeled and prefabricated in such a way to allow for the interface locations of laterally (e.g., vertically) adjacent layers to be offset such that each layer segment overlaps the laterally adjacent layer segments (e.g., the layer segments that are disposed above and/or beneath a given layer segment). As such, the horizontal track portion 10 can be constructed without the use of a single-plane vertical joint that extends entirely across the track rail (e.g., a butt joint) as is oftentimes provided on conventional prefabricated track arrangements. It is also to be appreciated that the layer segments can be modeled and prefabricated to facilitate alignment of the interior surfaces (e.g., 76, 88) such that they create a smoother, more accurate curve than conventional wood track which has interior surfaces that are manually cut on site.

As described above, each prefabricated layer segment can be assigned a particular location on the horizontal track portion 10 based on the computer model of the horizontal track portion 10. Each of the layer segments can be indexed and marked with indicia (e.g., 56, 68, 82) that indicate the location of each track piece relative to the other track pieces. During installation, the installer can install the layer segments in a prescribed order provided by the manufacturer (e.g., based upon the computer model). As such, the installation can be more organized, efficient, cost effective and environmentally friendly than conventional arrangements that requires each board to be fabricated on site by hand with repeated cuts and/or manual adjustments.

One example of a method of designing, fabricating, and installing the horizontal track portion 10 will now be discussed. First, the overall layout of the horizontal track portion 10 is selected and designed using computer generated modeling. As part of the design process, the shape and features for each layer segment of the horizontal track portion 10 can be mapped out. Each of the layer segments can then be cut from dimensional finished lumber in a factory or other controlled environment using the mapping generated during the design process. Each layer segment can also be provided with indicia or other markings that indicate how the layer segment is to be installed relative to the other layer segments and/or ledgers (e.g., 151) of the horizontal track portion 10. Once the layer segments are fabricated, they can be delivered to the destination site for assembly. The horizontal track portion 10 can then be assembled by first constructing the bottommost base layer (e.g., 16), then constructing the remaining base layers sequentially on top of the bottom most base layer, and then constructing the lower and upper track layers sequentially on top of the base layers. The layers can therefore be stacked along an assembly axis A1 (FIG. 4) into an arrangement of layers that are oriented horizontally and are laterally adjacent to each other. The assembly axis A1 can be substantially perpendicular to the travel path of the train car 15 (e.g., in the x-direction shown in FIG. 3) and to the widths (W1, W2, W3) of the layers and substantially parallel to the thicknesses (T1, T2, T3) of those layers. The interior surfaces (e.g., 76, 88, 90) of each layer segment of the base layers 16 can define the overall path of the train car 15. The running plates (not shown) can be assembled onto the top, sides, and bottom of the interior portions 22, 24 of the lower and upper track layers 18, 20.

Although the fabrication and construction of the horizontal track portion 10 of track is described, it is to be appreciated that a vertical track portion (e.g., 110) or some combination of vertical and horizontal track portions of track (e.g., a three-dimensional curve), as described in further detail below, can be constructed according to the principles and methods described above. It is also to be appreciated that although dimensional lumber is described above, the layer segments can be fabricated from any of a variety of suitable alternative substrates that can be cut with an automated precision cutting device, such as, for example, composite lumber or other wood stock (in dimensional shapes or sheet), thermoplastics or metals (e.g., steel).

Figure 8:
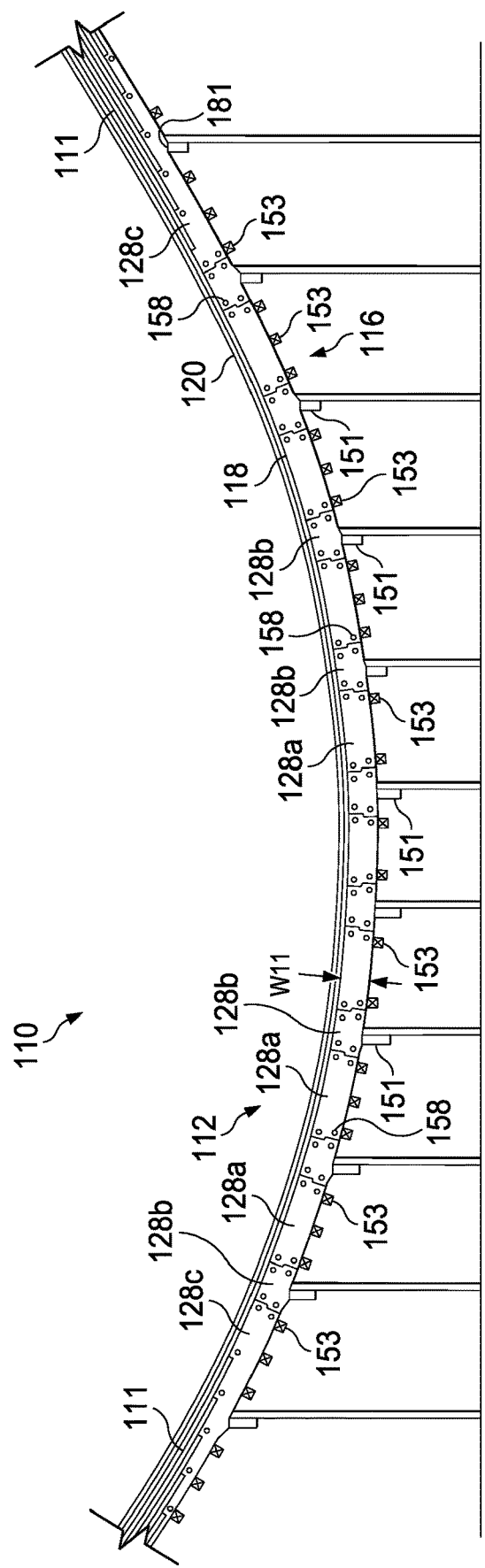
FIG. 8 is a side elevational view depicting a right rail of a vertical track portion of a roller coaster track that comprises a plurality of base layers, a lower track layer, and an upper track layer, in accordance with one embodiment.
Figure 9:
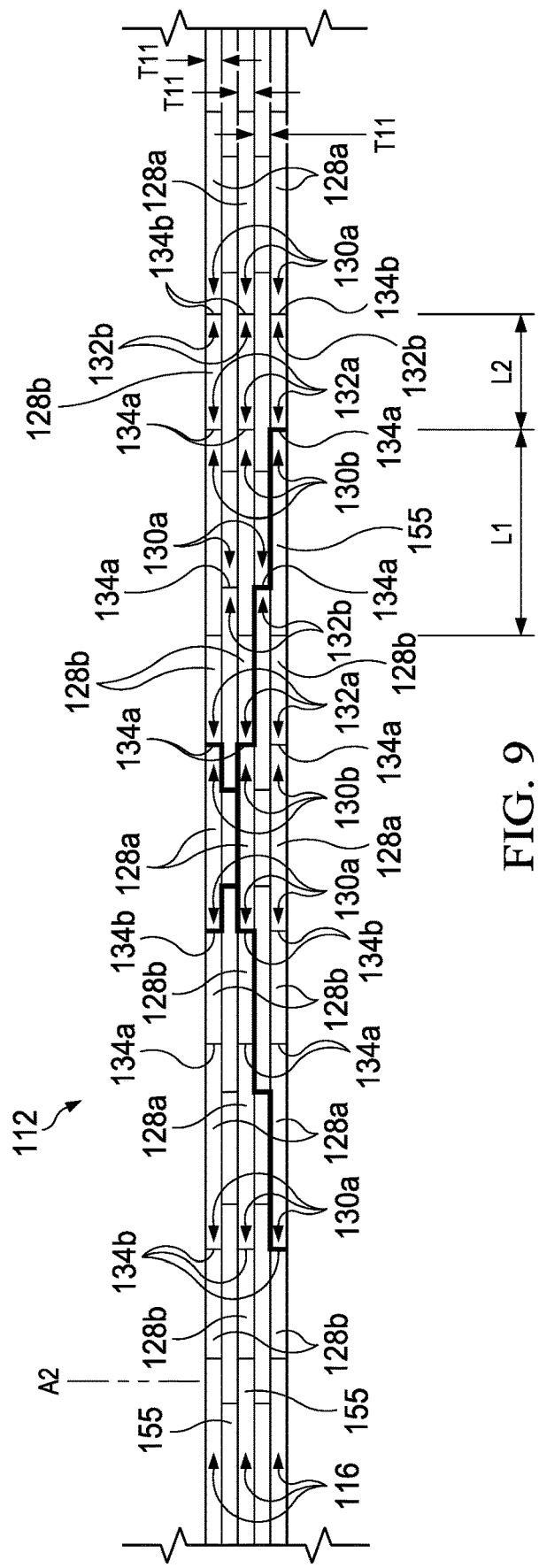
FIG. 9 is an upper elevational view depicting the right rail of FIG. 8 but with the lower track layer and the upper track layer removed for clarity of illustration.

Referring now to FIGS. 8 and 9, a vertical track portion 110 of a roller coaster track that defines a vertical curve (e.g., a hill) is generally depicted. Certain features of the vertical track portion 110 can be similar to, or the same in many respects as, the horizontal track portion 10 of the roller coaster track illustrated in FIGS. 1-7. For example, the vertical track portion 110 can include a right rail 112 that includes a plurality of base layers 116 (FIG. 9), a lower track layer 118 (FIG. 8), and an upper track layer 120 (FIG. 8). The lower track layer 118 and the upper track layer 120 can be positioned over the base layers 116 and arranged horizontally. The lower track layer 118 and the upper track layer 120 can be formed of discrete layers (not shown). The lower track layer 118 and the upper track layer 120 can each include respective interior portions (not shown) that overhang the base layers 116. Running plates (not shown) can be provided on the top, sides, and bottom of the interior portions to provide a running surface (e.g., a contact surface) for the wheels of the train cars. A plurality of ledgers 151 and cross ties 153 can underlie the base layers 116 to provide underlying support to the vertical track portion 110.

The base layers 116 of the vertical track portion 110, however, can be arranged vertically (instead of horizontally) in order to withstand the increased vertical forces (e.g., in the z-direction) associated with the train car traversing this section of track (e.g., a hill or valley), as will be described in further detail below. With the exception of being arranged vertically, the base layers 116 can be similar to, or the same as in many respects as, the base layers 16 illustrated in FIGS. 1-5. For example, as illustrated in FIG. 9, each of the base layers 116 can include a plurality of base layer segments 128*a* that each have a first end 130*a* and a second end 132*a* and a plurality of base layer segments 128*b* that each have a first end 130*b* and a second end 132*b*. The base layer segments 128*a*, 128*b* can be laid end-to-end in an alternating fashion and in a contacting relationship with each other such that the first end 130*a* of each base layer segment 128*a* is in contact with the second end 132*b* of an adjacent base layer segment 128*b* at an interface location 134*a*, and the second end 132*a* of each base layer segment 128*a* is in contact with the first end 130*b* of an adjacent base layer segment 128*b* at an interface location 134*b*. In one embodiment, as illustrated in FIG. 9, the first ends 130*a*, 130*b* and the second ends 132*a*, 132*b* can be notched such that when the base layer segments 128*a*, 128*b* are laid end-to-end in an alternating fashion and in a contacting relationship with each other, the first end 130*a* and the second end 132*b* interlock and the second end 132*a* and the first end 130*b* interlock to resist relative (e.g., vertical) movement between the base layer segments 128*a*, 128*b*. It is to be appreciated that the base layer segments 128*a*, 128*b* can have any of a variety of suitable alternative interlocking features that facilitate lateral coupling and/or visual indication of the relative physical positioning between the base layer segments 128*a*, 128*b*.

Each base layer 116 can be arranged such that the interface locations (e.g., 134*a*, 134*b*) between each pair of layer segments are longitudinally offset (e.g., along the travel path of the train car) from the interface locations of laterally (e.g., horizontally) adjacent layers (e.g., in a direction perpendicular to the travel path of the train car). Each layer segment can accordingly overlap (e.g., extend beyond) the interface locations of the adjacent layers to distribute the weight of the train cars more evenly than would be provided with a conventional butt joint (e.g., where the interface locations of laterally adjacent layers are aligned in a plane that is perpendicular to the travel path of the train car).

Referring again to FIGS. 8 and 9, each base layer segment 128*a*, 128*b* can have a thickness T11 (FIG. 9) and a width W11 (FIG. 8) that is greater than the thickness T11. Each of the base layer segments 128*a*, 128*b* can cooperate to define an upper surface 155 (FIG. 9) that extends along the thicknesses T11 of base layers 116. The lower track layer 118 and the upper track layer 120 can be routed along and secured to the base layers 116 such that the lower track layer 118 rests on the upper surface 155. It is to be appreciated that a base layer (e.g., 116) of the vertical track portion 110 that is described as being arranged vertically can be understood to mean that the thickness (e.g., T11) of the base layer 116 can extend substantially parallel to the running surface of the roller coaster defined by the lower and upper track layers 118, 120.

Referring again to FIG. 8, each of the base layer segments 128*a*, 128*b* can define a plurality of first vertical holes 158. Dowels (not shown) or other fasteners can be provided through the first vertical holes 158 and into corresponding holes in the immediately adjacent base layer 116 to couple the base layers 116 together. Each of the base layer segments 128*a* can have a length L1 and each of the base layer segments 128*b* can have a length L2 that is shorter than the length L1 of the base layer segments 128*a*. In one embodiment, the length L1 of the base layer segments 128*a* can be selected to be long enough to span at least two of the ledgers 151 such that the weight of the train cars is distributed among the cross ties 153.

Each of the base layers 116 can include shoulder features 181 that extend along the width of the right rail 112 and are configured to rest upon each of the ledgers 151. Each of the shoulder features 181 can be shaped to have a lower surface that corresponds with the shape of an upper surface of the ledgers 151 to distribute the weight of the right rail 112 and/or the train cars more evenly upon the ledgers 151. The shoulder features 181 can also serve as alignment points for the base layers 116 relative to the ledgers 151 during assembly of the right rail 112.

Still referring to FIG. 8, each of the base layers 116 can comprise distal base layer segments 128*c* that each define a stair stepped profile that allows for the right rail 112 to be easily integrated into a horizontal track arrangement when retrofitting the right rail 112 into an existing horizontal track portion of a track 111. It is to be appreciated that for new construction, the distal base layer segments 128*c* might not be included as part of the overall track design.

One example method of designing, fabricating, and installing the vertical track portion 110 will now be described. First, the overall layout of the vertical track portion 110 is selected and designed using computer generated modeling. As part of the design process, the shape and features for each layer segment (e.g., 128*a*, 128*b*, 128*c*) of the vertical track portion 110 can be mapped out to define a vertical shape for the vertical track portion 110 that contributes to the vertical component of the travel path for the train car. Each of the layer segments can then be prefabricated (as described above) and delivered to the destination site for assembly. The vertical track portion 110 can then be assembled by first assembling each of the base layers (e.g., 116) from the layer segments. Each of the base layers can be oriented vertically such that the thickness (e.g., T11) each base layer 116 extends along the width of the lower and upper track layers 118, 120. Each of the base layers can be stacked together along an assembly axis (e.g., A2 in FIG. 9) that is substantially perpendicular to the travel path of the train car 15 and the width W11 of the base layers 116. Once the base layers 116 are assembled, the interior surfaces of each layer segment of the base layers 116 can define the vertical component of the travel path of the train car.

Each base layer 116 can be arranged such that an interface location (e.g., 134*a*, 134*b*) between each pair of layer segments (e.g., 128*a*, 128*b*, 128*c*) for a given base layer is longitudinally offset (e.g., along the travel path of the train car) from the interface locations of the laterally (e.g., horizontally) adjacent layers (e.g., in a direction that is perpendicular to the travel path of the train car). Each base layer is accordingly positioned relative to the other laterally adjacent layers such that each layer segment overlaps (e.g., extends beyond) the layer segments of the laterally adjacent layers to create a plurality of layer segment interfaces that are longitudinally offset from one another (e.g., along the travel path of the train car 15).

It is to be appreciated that each of the layer segments can be assembled on site to form the vertical track portion 110 in a layer-by-layer arrangement having the overlapping features described above which can distribute the weight of the train cars more evenly than conventional prefabricated track arrangements. For example, conventional prefabricated arrangements are typically formed of discrete rail sections (e.g., formed of wood or steel) and are prefabricated with planar ends (e.g., each rail section having a singular end surface that is disposed in a plane) and are laid end-to-end in an abutting relationship (e.g., at a butt joint, a splice, or a similar single-point rail joint. Each rail section is connected to an adjacent rail section with shear braces that connect the rail sections together and which can be susceptible to significant flexing, deformation, and even failure (e.g., in the z-direction shown in FIG. 3) when a train car traverses the rail sections. By overlapping the interface locations of the layer segments, the base layers can be attached together (e.g., with bolts, adhesives, and/or dowels) without use of shear braces or other shear attachment arrangements that are otherwise used in conventional prefabricated arrangements.

It is to be appreciated that a left rail 114 of the vertical track portion 110 can be formed similarly as the right rail 112 described above, but configured to be provided on the left side of the vertical track portion 110. It is also to be appreciated that the layer segments (e.g., 128a, 128b, 128c) of the right and left rails of the vertical track portion 110 can be fabricated in a similar manner as described above with respect to the horizontal track portion 10 in FIGS. 1-7. Alternately, the track could be defined by a single rail (e.g., a monorail), with track layers that extend beyond the base layers on both sides in order to accommodate a ride vehicle.

It is to be appreciated that by orienting the base layers (e.g., 116) of the vertical track portion 110 vertically and in an offset arrangement as described above, the weight of the train cars of the roller coaster can be borne by the width of the base layers 116 and thus the base layers 116 can be less susceptible to vertical flexing and deformation when traversed by a train car than base layers that are horizontally oriented (e.g., layers 16, 18, 20 described above). As such, vertically oriented base layers (e.g., 116) can be particularly suited for portions of the track that experience increased vertical forces (e.g., in the z-direction shown in FIG. 3), such as hills and valleys, for example.

Figure 10:
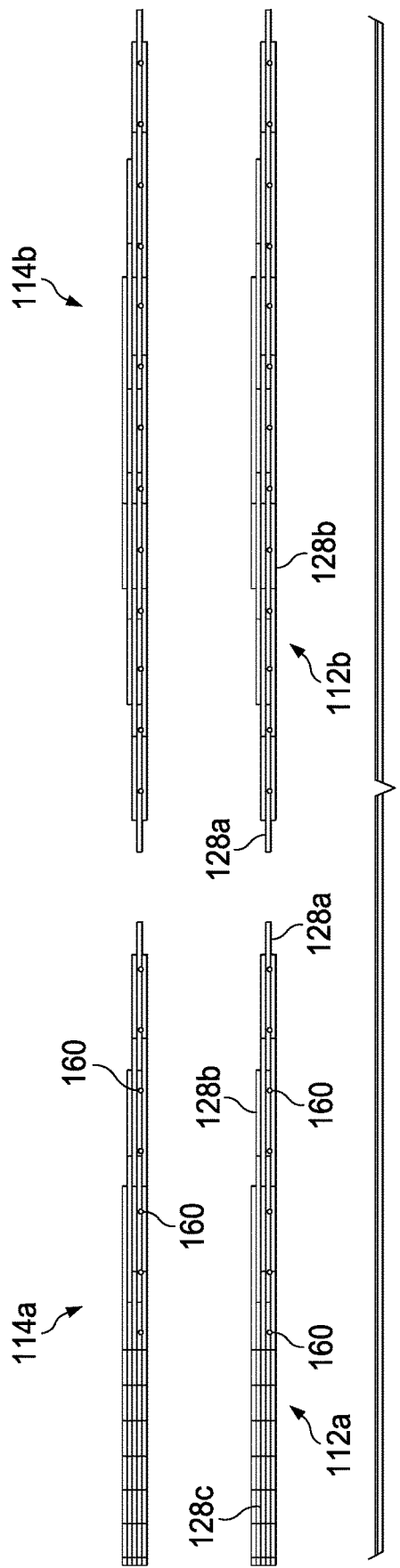
FIG. 10 is a top plan view depicting left and right rail sections of the vertical portion of FIGS. 8 and 9.

Referring now to FIGS. 10-21, one example of a method for manufacturing and installing the vertical track portion 110 is illustrated and will now be discussed. First, the overall layout of the right and left rails 112, 114 of the vertical track portion 110 is selected and designed using computer generated modeling. As part of the design process, the shape and features for each layer segment (e.g., 128a, 128b, 128c) of the right and left rails 112, 114 can be mapped out to define a vertical shape for the vertical track portion 110 of the track and prefabricated (as described above). As illustrated in FIG. 10, the right rail 112 can then be assembled into discrete first and second rail sections 112a, 112b that are separate from each other and the left rail 114 can be assembled into discrete first and second rail sections 114a, 114b that are separate from each other.

Each of the discrete first and second rail sections 112a, 112b can comprise a plurality of base layer segments 128a, 128b, 128c that overlap each other to form a plurality of base layers 116 in a similar manner as described above with respect to FIGS. 8 and 9. Each of the base layer segments 128a, 128b, 128c can be secured together with fasteners (e.g., nuts and bolts) that extend substantially horizontally through the base layer segments 128a, 128b, 128c (e.g., though horizontal holes that are aligned through the base layer segments 128a, 128b, 128c). It is to be appreciated that the discrete first and second rail sections 114a, 114b of the left rail 114 can be assembled in a similar manner. A plurality of vertical holes 160 that are substantially perpendicular to the horizontal holes can then be drilled through the discrete first and second rail sections 112a, 112b, 114a, 114b.

Figure 11:
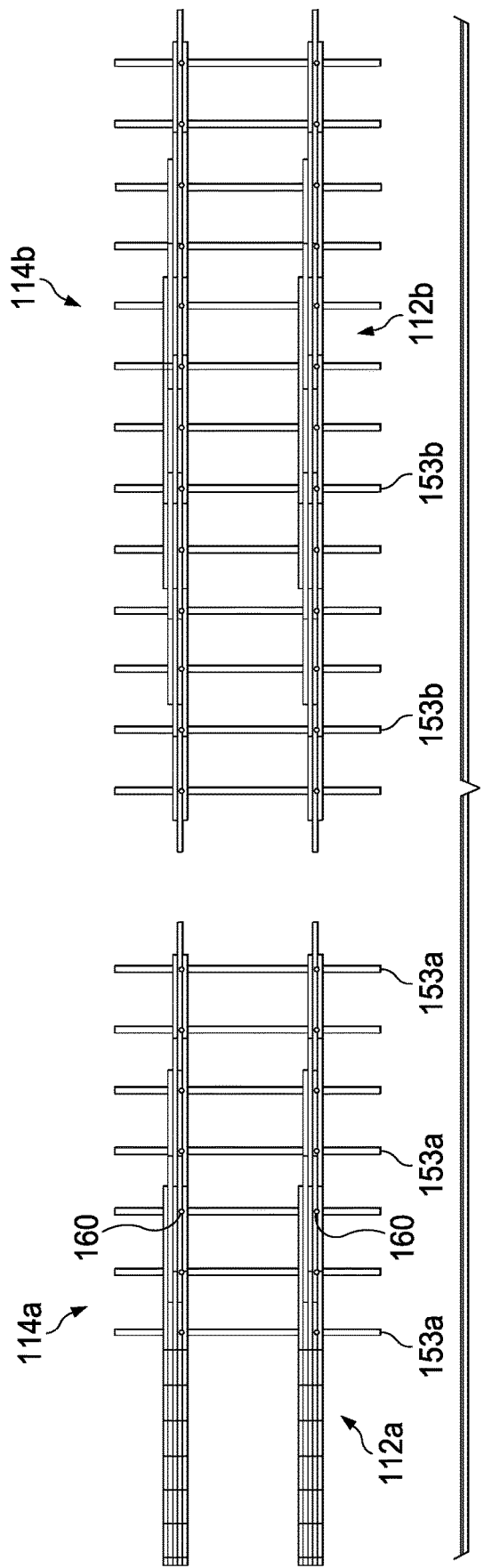
FIG. 11 is a top plan view depicting a plurality of cross ties associated with the left and right rail sections of FIG. 10.
Figure 12:
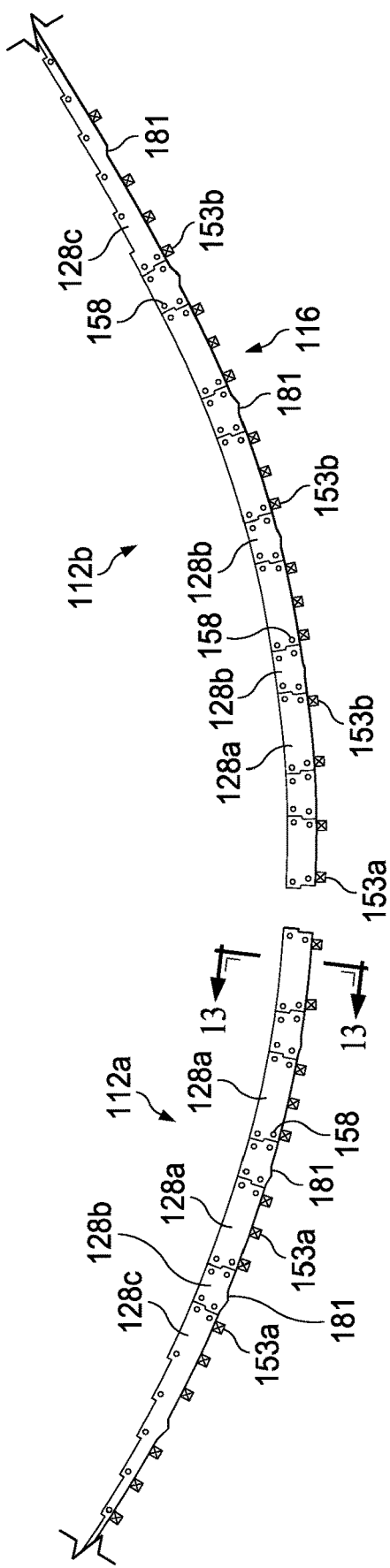
FIG. 12 is a side elevational view depicting the left and right rail sections and the cross ties of FIG. 11.
Figure 13:
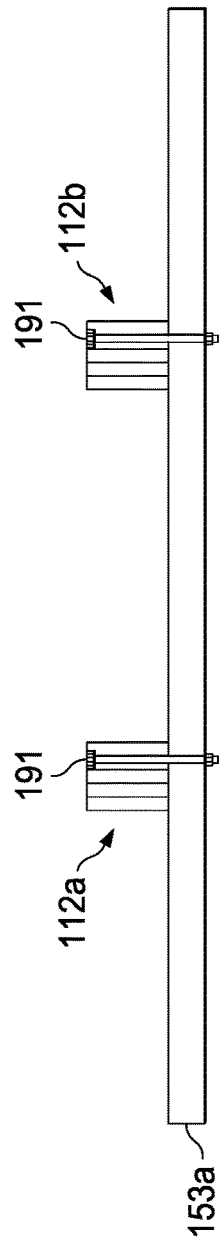
FIG. 13 is a cross-section view taken along the line 13-13 in FIG. 12.

As illustrated in FIGS. 11 and 12, a plurality of cross ties 153a can be installed beneath the discrete first rail sections 112a, 114a and can extend laterally between the discrete first rail sections 112a, 114a. Each of the cross ties 153a can be aligned with respective pairs of the vertical holes 160 in the discrete first rail sections 112a, 114a, as illustrated in FIG. 11. As illustrated in FIG. 13, each of the cross ties 153a can be attached to the discrete first rail sections 112a, 114a with bolts 191 that are provided through the vertical holes 160 of the discrete first rail sections 112a, 114a and through the cross tie 153a. It is to be appreciated that a plurality of cross ties 153b can be installed beneath the discrete second rail sections 112b, 114b in a similar manner.

Figure 14:
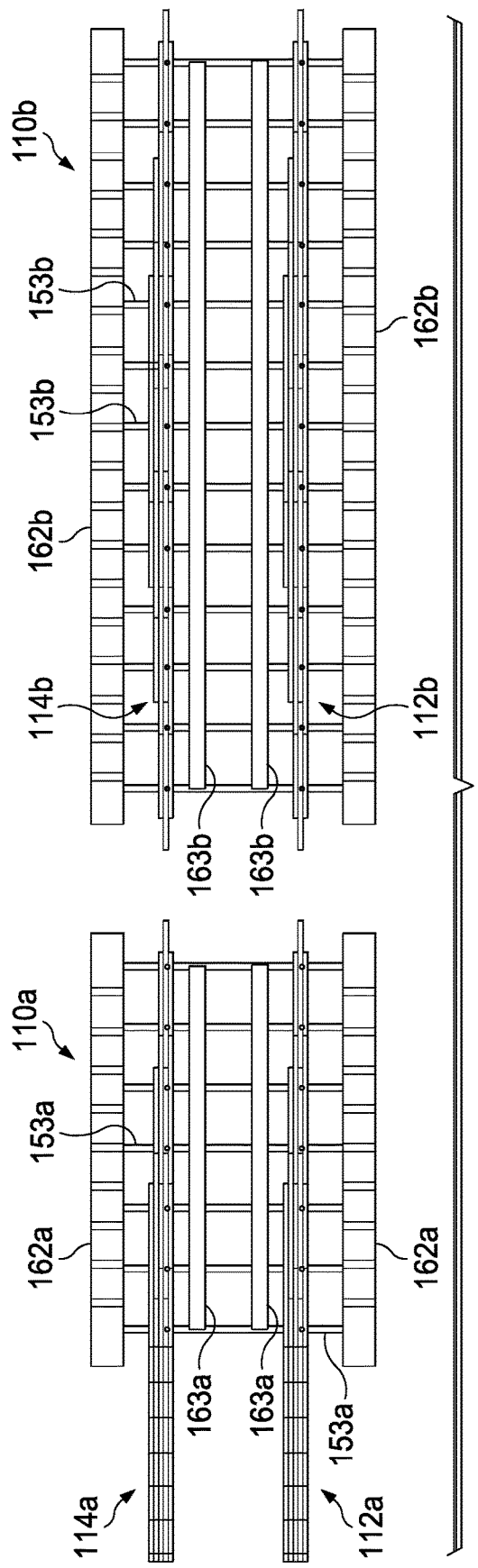
FIG. 14 is a top plan view depicting a plurality of center boards and a plurality of walk boards associated with the left and right rail sections and the cross ties of FIG. 10.

Referring now to FIG. 14, a pair of walk boards 162a can be attached to the cross ties 153a on opposite sides of the discrete first rail sections 112a, 114a. A pair of center boards 163a can be attached to the cross ties 153a between the discrete first rail sections 112a, 114a. The center boards 163a can be spaced from each other by a distance (e.g., by about 12 inches or less) that can prevent an installer from falling between the discrete first rail sections 112a, 114a. It is to be appreciated that a pair of walk boards 162b and center boards 163b can be installed among the discrete second rail sections 112b, 114b in a similar manner.

The discrete first rail sections 112a, 114a, the plurality of cross ties 153a, the pair of walk boards 162a, and the pair of center boards 163a (collectively the first vertical rail section 110a) and the discrete second rail sections 112b, 114b, the plurality of cross ties 153b, the pair of walk boards 162b, and the pair of center boards 163b (collectively the second vertical rail section 110b) can be prefabricated in a controlled environment at a manufacturing facility that is remote from the amusement park. Assembling the first and second vertical rail sections 110a, 110b first in a manufacturing facility can allow the first and second vertical rail sections 110a, 110b to be manufactured more precisely and with tighter tolerances than is currently possible with conventional stick building methods that occur at the amusement park site.

Referring now to FIG. 15, once the first vertical rail section 110a has been assembled at the manufacturing facility, it can be loaded onto a tractor-trailer 131 via a crane 133 and delivered to the amusement park site with the tractor-trailer 131. The first vertical rail section 110a can then be unloaded from the tractor-trailer 131 via a crane 135 at the amusement park. The crane 135 can lift the first vertical rail section 110a into place onto a substructure 149 that has already been constructed at the amusement park. The second vertical rail section 110a can be delivered to the amusement park site in a similar manner such that the first and second vertical rail sections 110a, 110b can be assembled similar to the manner in which conventional steel roller coasters are assembled. To this end, each of the first and second vertical rail sections 110a, 110b can be designed and engineered to be installed at a specific location along the track which can alleviate the need to repeatedly survey and adjust the track to achieve a desired curve profile as is common with conventional stick building methods that occur at the amusement park site.

Figure 16:
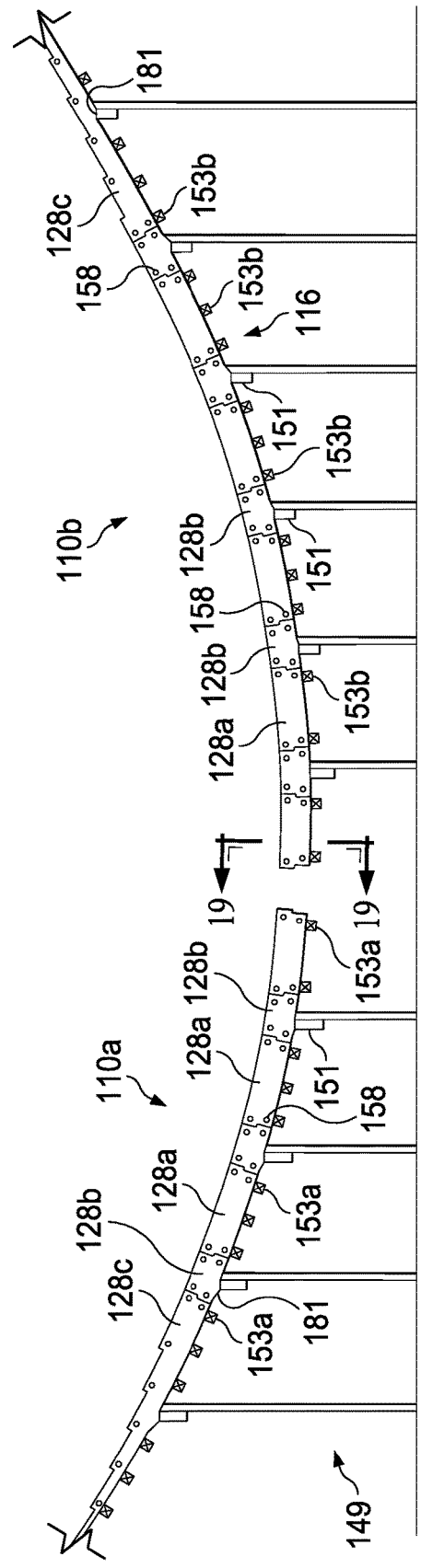
FIG. 16 is a side elevational view of the first and second track portions in association with a substructure.

Referring now to FIG. 16, the first and second vertical rail sections 110a, 110b are shown to be placed onto the substructure 149 (e.g., by the crane 135 of FIG. 15). The substructure 149 can include a plurality of ledgers 151 that extend laterally (relative to the travel path) and are configured to support the first and second vertical rail sections 110a, 110b. The ledgers 151 can be initially be positioned along the substructure 149 (e.g., during assembly of the substructure 149 and prior to placement of the first and second vertical rail sections 110a, 110b) to roughly match the overall curve profile defined by the first and second vertical rail sections 110a, 110b. When the first and second vertical rail sections 110a, 110b are placed on the substructure 149, any of the ledgers 151 that do not provide adequate underlying support to the first and second vertical rail sections 110a, 110b can be repositioned and/or shimmed until each of the ledgers 151 adequately support the first and second vertical rail sections 110a, 110b. Since the first and second vertical rail sections 110a, 110b are prefabricated prior to delivery to the amusement park, the curve profile of the track is effectively set by the first and second vertical rail sections 110a, 110b and the substructure 149 is adjusted to conform to the first and second vertical rail sections 110a, 110b which can alleviate the need to adjust the track and the substructure simultaneously, as is common in conventional arrangements, which can be time consuming, expensive and imprecise. It is to be appreciated that the first and second vertical rail sections 110a, 110b can be prefabricated with any of a variety of design features that can aid in aligning and supporting the first and second vertical rail sections 110a, 110b on the substructure 149 (e.g., shoulder features 181 illustrated in FIG. 8).

Figure 17:
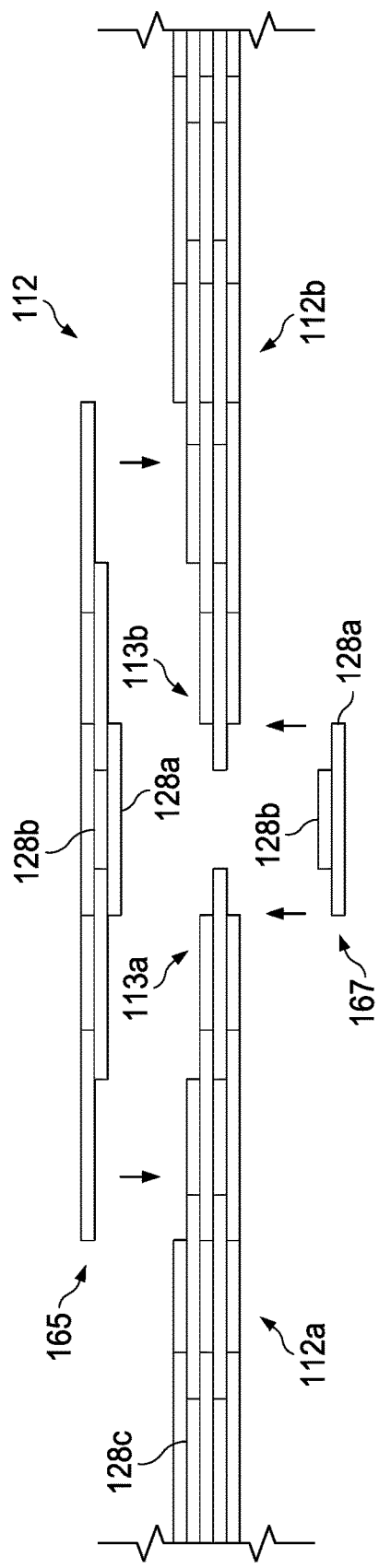
FIG. 17 is a partially exploded top plan view depicting the right rail section of FIG. 11 in association with first and second rail splices.
Figure 18:
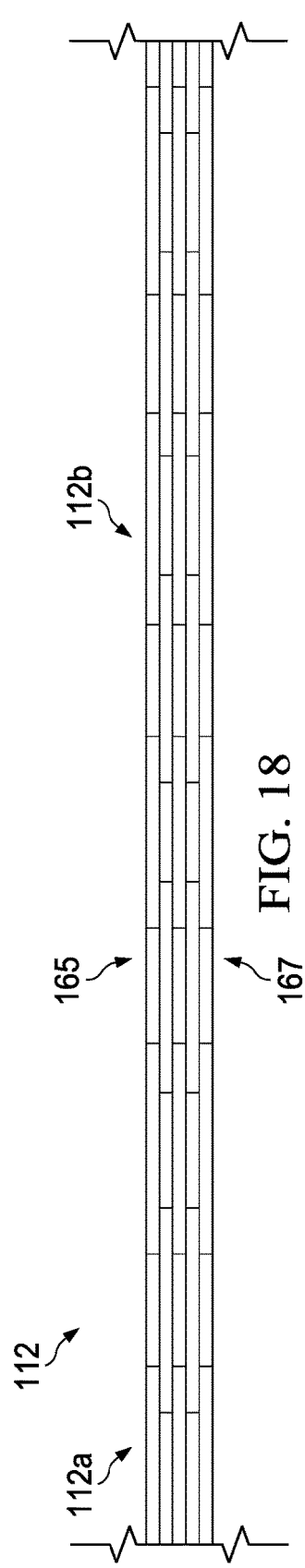
FIG. 18 is an assembled top plan view of the right rail section and the first and second rail splices of FIG. 17.

Referring now to FIGS. 17 and 18, the completion of the assembly of the right rail 112 will now be discussed. A first rail splice 165 and a second rail splice 167 can be provided. Each of the first and second rail splices 165, 167 can be formed of base layer segments 128a, 128b in a similar manner as described above with respect to the discrete first and second right rail sections 112a, 112b. The first and second rail splices 165, 167 can be prefabricated at the manufacturing facility and delivered to the amusement park site together with the first and second vertical rail sections 110a, 110b. The first and second rail splices 165, 167 can be sandwiched against and can mate with proximal ends 113a, 113b of the discrete first and second rail sections 112a, 112b. The first and second rail splices 165, 167 can be attached to the proximal ends 113a, 113b of the discrete right rail sections 112a, 112b with bolts (not shown) such that the discrete first and second rail sections 112a, 112b, and the first and second rail splices 165, 167 complete the right rail 112 when installed. It is to be appreciated that the left rail 114 can be assembled in a similar manner.

Figure 19:
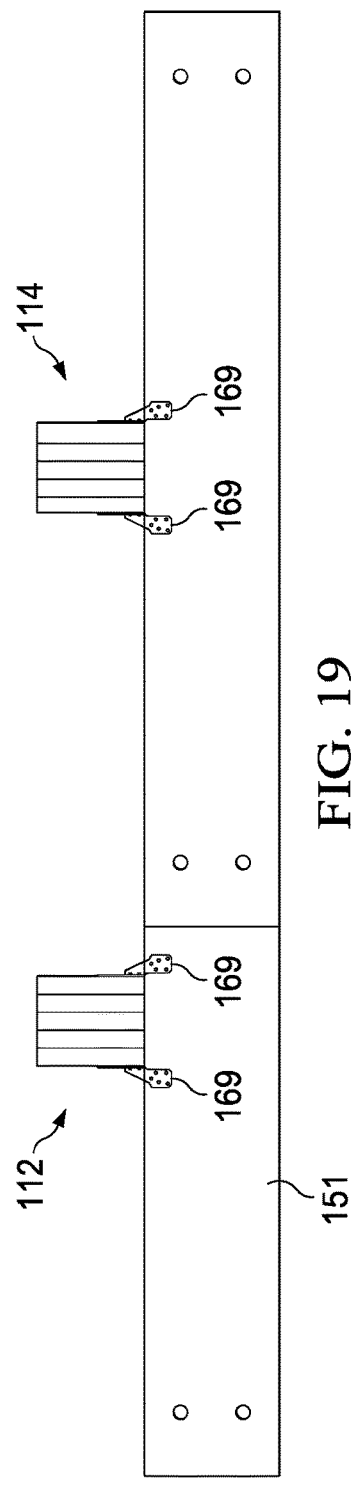
FIG. 19 is a cross-section view of the arrangement shown in FIG. 13 but with brackets attaching the right and left rails to a ledger.
Figure 20:
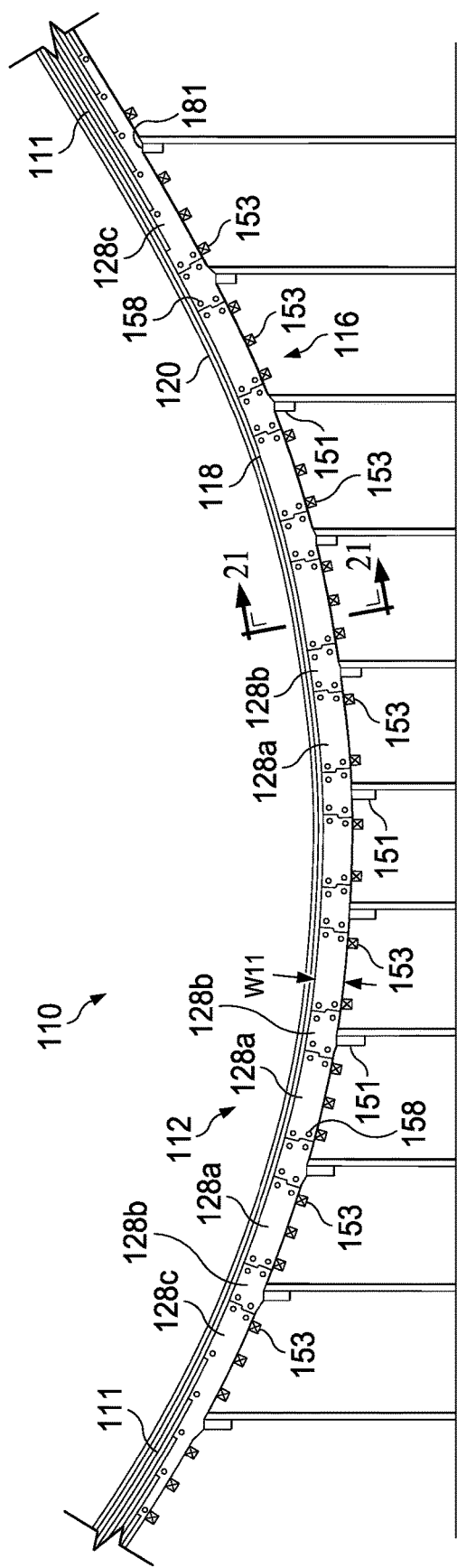
FIG. 20 is a side elevational view of a fully assembled vertical track portion.
Figure 21:
FIG. 21 is a sectional view taken along the line 21-21 in FIG. 20.

Referring now to FIG. 19, each of the right and left rails 112, 114 can be attached to the ledgers 151 with a bracket 169. In one embodiment, the bracket 169 can comprise a hurricane tie. Referring now to FIG. 20, the lower and upper track layers 118, 120 can be installed over the right rail 112. In one embodiment, the center boards 163a, 163b can be used as a jig for the lower and upper track layers 118, 120 during installation to create a proper curve for the lower and upper track layers 118, 120. As illustrated in FIG. 21, a top running plate 171 can be installed over the upper track layer 120 and coupled thereto by a bolt (not shown). A bottom running plate 173 can be installed under the lower track layer 118 and coupled thereto by a bolt (not shown). A side running plate 175 can be installed on the lower track layer 118 and the upper track layer 120 adjacent to the top and bottom running plates 171, 173 and coupled thereto by a bolt (not shown). Lower and upper track layers 196, 198 and top, bottom, and side running plates 177, 179, 183 can be installed over the left rail 114 in a similar manner.

By manufacturing the first and second vertical rail sections 110a, 110b first in a manufacturing facility and then delivering the first and second vertical rail sections 110a, 110b to the amusement park site, the vertical track portion 110 can be installed more easily and efficiently and without the skilled labor often required for conventional wooden roller coaster tracks that are stick-built on-site (e.g., built entirely at the amusement park). As such, the vertical track portion 110 of the roller coaster can be manufactured and installed more efficiently and cost effectively than conventional roller coaster tracks. It is to be appreciated that the method for manufacturing and installing the vertical track portion 110 illustrated in FIGS. 10-21 can also be used to manufacture and install the horizontal track portion 10 illustrated in FIGS. 1-9.

One example of a method for prefabricating a rail section having a complex, three-dimensional curve (e.g., a rail section with a curve in both the horizontal and vertical directions) will now be discussed. First, a computer model of the three-dimensional curve of the rail section is generated (e.g., using computer-aided design software). The computer model can identify the three-dimensional shapes of the various layer segments (e.g., 28, 36, 44) that are necessary to form the base layer(s) (e.g., 16) and the lower and upper track layers (e.g., 18, 20) for the three-dimensional curve. A planar shape for each of the layer segments can then be extrapolated/rendered from the three-dimensional shaped segments. Planar layer segments can then be cut from dimensional lumber (e.g., via a CNC machine in a factory or other controlled environment) based on the planar shapes extrapolated from the computer model to essentially form a temporary two-dimensional curve. The planar layer segments can then be stacked together on the track without attaching the planar layer segments to the track. The planar layer segments can then be bent into the three-dimensional curve shape (along the weak axis) and then permanently attached to the track (e.g., with bolts).

It is to be appreciated that the bending of the planar layer segments can be achieved through engineered stressing and without requiring the applied stresses that are often associated with conventional methods for forming three-dimensional curves (e.g., the pretensions between the track and underlying structure that cause additional stresses in the track that differ from and at times exceed the design stress). For example, in certain conventional arrangements, the boards that form each layer can be bent using a profiling process in which the boards are manually bent in a vertical direction (sometimes beyond the design curvature) in order to create a continuous curve between ledgers (e.g., 151). In such an example, the boards can be bent by first attaching equipment to the substructure that selectively forces the boards into a desired direction by loading and stressing the boards and/or the structure differently than the loads and stresses that are typically imparted to the layer segments during normal operation of the roller coaster (e.g., during passage of the train car 15). Once the boards are bent into a desired position, they can be secured to the substructure (e.g., with nails) which can introduce an undesirable prestress in the boards, the substructure, and/or the connections therebetween. In other conventional arrangements, the boards might be forcibly attached to a misplaced or imprecise ledger. If the underlying structure is not within tolerance, the track layers can be stressed differently than intended in the design. It is to be appreciated that by modeling the three-dimensional curve first and then cutting planar boards that are performed to create the three-dimensional curve when bent into position, much of these undesired prestresses on roller coaster track and substructure can be avoided which can prolong the useful life of the track.

Figure 23:
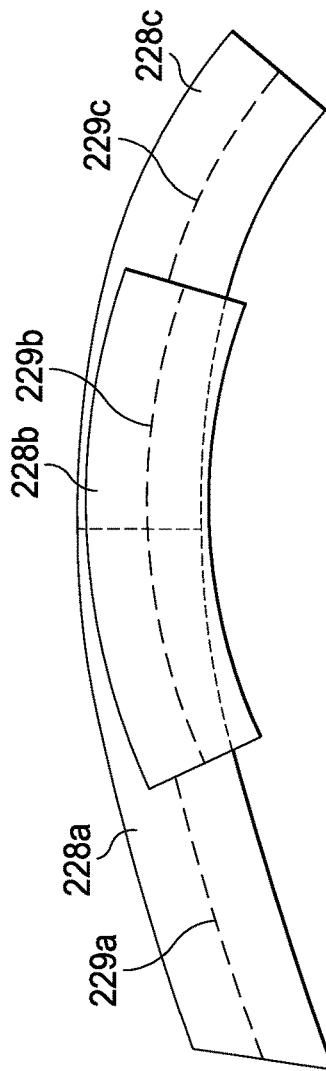
FIG. 23 is a schematic view of the three base layer segments of FIG. 21 but with one of the base layer segments stacked upon the remaining base layer segments.
Figure 24:
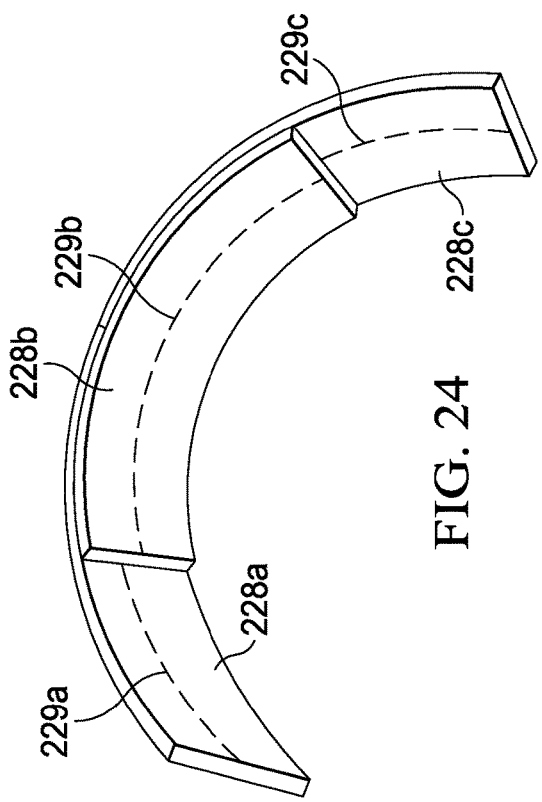
FIG. 24 is an isometric view depicting the three base layer segments assembled together and curved to define a three-dimensional curve.
Figure 22:
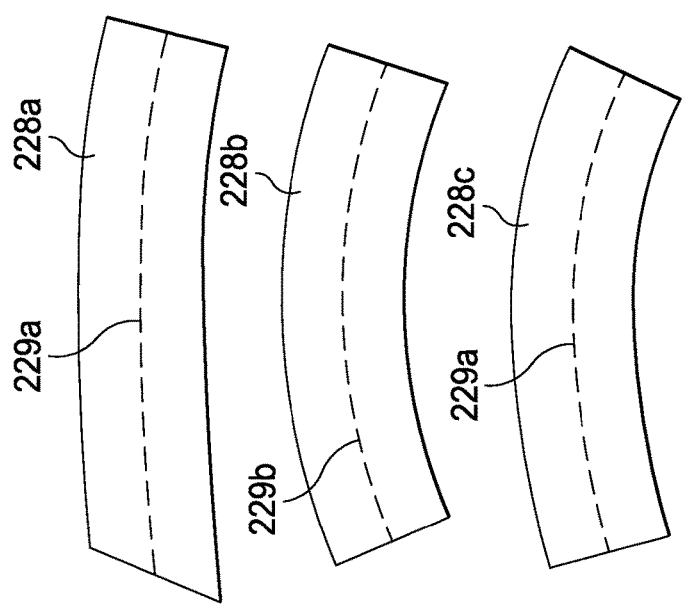
FIG. 22 is a schematic view depicting three base layer segments in accordance with another embodiment.

Referring now to FIGS. 22-24, three base layer segments 228a, 228b, 228c are illustrated that cooperate to form part of a three-dimensional curve. As illustrated in FIG. 22, each of the base layer segments 228a, 228b, 228c are substantially planar pieces (e.g., two-dimensional) that have been cut from dimensional lumber based upon a three-dimensional computer generated model as described above. When the base layer segments 228a, 228b, 228c are laid flat (e.g., in two-dimensions) and stacked together, as illustrated in FIG. 23, the base layer segments 228a, 228b, 228c are not aligned. However, when the base layer segments 228a, 228b, 228c are collectively bent into the proper three-dimensional curve for the rail section, as illustrated in FIG. 24, the base layer segments 228a, 228b, 228c can be substantially aligned to and can be attached to the track to form a continuous rail section. In one embodiment, each of the base layer segments 228a, 228b, 228c can comprise a longitudinal line 229a, 229b, 229c disposed thereon that indicates to a user when the base layer segments 228a, 228b, 228c have been bent into the proper shape. For example, when the base layer segments 228a, 228b, 228c are laid flat, as illustrated in FIG. 23, the longitudinal line 229c on the base layer segment 228c can be askew to the longitudinal lines 229a, 229b of the base layer segments 228a, 228b. When the base layer segments 228a, 228b, 228c are collectively bent into the proper three-dimensional curve, the longitudinal line 229a, 229b, 229c of the base layer segments 228a, 228b, 228c can align, to indicate to a user that the base layer segments 228a, 228b, 228c are properly aligned and can be attached to the track. It is to be appreciated that the contour of the rail section illustrated in FIG. 24 has been exaggerated for purposes of illustration. It is also to be appreciated that although longitudinal lines 229a, 229b, 229c are described, any of a variety of alignment features are contemplated that provide a visual indication when the base layer segments 228a, 228b, 228c are aligned properly into a three-dimensional curve, such as, for example, holes, tabs, notches, fasteners or other indicia. It is further to be appreciated that any of a variety of suitable alternative layer segments, such as track layer segments, jig boards, and center boards, can be prefabricated with a complex, three-dimensional curve in a similar manner as described above with respect to the base layer segments 228a, 228b, 228c.

Figure 25:
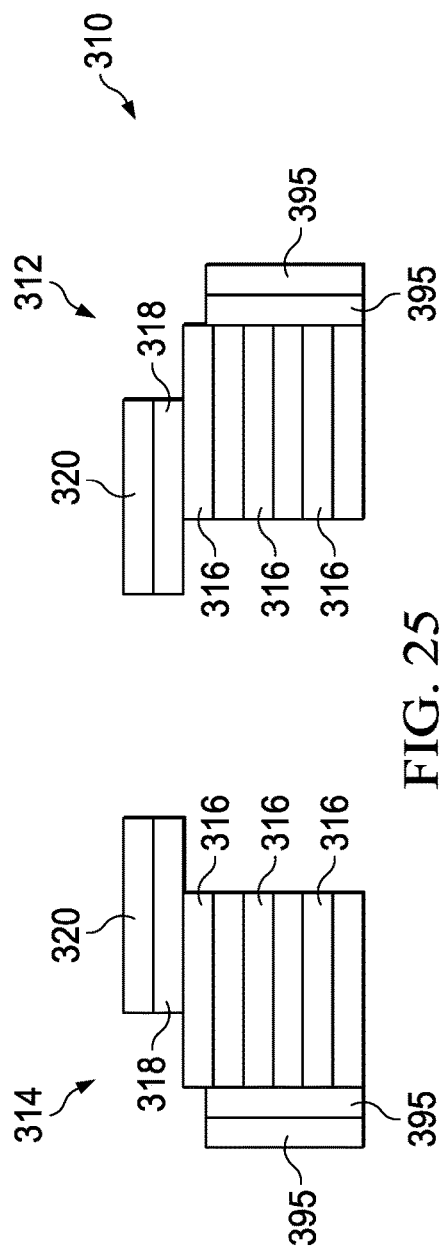
FIG. 25 is a cross-section view depicting a right rail and a left rail of a horizontal track portion of a roller coaster track, in accordance with another embodiment.

FIG. 25 illustrates an alternative embodiment of a horizontal track portion 310 of a roller coaster track that is similar to, or the same in many respects as the horizontal track portion 10 illustrated in FIGS. 1-7. For example, the horizontal track portion 310 can include a right rail 312 and a left rail 314. The right rail 312 and the left rail 314 can each include a plurality of base layers 316, a lower track layer 318, and an upper track layer 320 that are arranged horizontally. However, a pair of vertical guide boards 395 can be laterally adjacent to the base layers 316. The vertical guide boards 395 can be provided along the outside of the right rail 312 and the left rail 314 such that the right rail 312 and the left rail 314 are disposed between the vertical guide boards 395.

The vertical guide boards 395 can be configured (e.g., cut) to define a vertical component of the curve of the roller coaster track (e.g., similar to the way the vertical boards 110 described above define a vertical curve) for the base layers 316. During assembly of the track, the vertical guide boards 395 can be attached first to ledgers (e.g., 151 (not shown)) to serve as a jig for attaching the base layers 316 thereto. For each of the right and left rails 312, 314, a bottommost layer of the base layers 316 (e.g., the base layer 316 most proximate to the ledgers) can then be butted against the vertical guide board 395 and attached at one end to the ledgers. The bottommost base layer 316 can then be bent in the weak direction (e.g., in the up/down direction) against the vertical guide boards 395 and attached to the ledgers to impart a vertical component into the curve. The bottommost base layer 316 and the vertical guide boards 395 associated therewith can cooperate to define a cross-sectional L-shape. The rest of the base layers 316, and the lower and upper track layers 318, 320 can then be attached over the bottommost base layer 316 in a similar manner. Once the construction of the right and left rails 312, 314 is complete, the vertical guide boards 395 can be removed. It is to be appreciated that the vertical guide boards can be prefabricated in a similar manner as the base layers 116 of the vertical track portion 110 described above. It is also to be appreciated that vertical guide boards 395 can additionally or alternatively be provided on the inside of the right and left rails 312, 314.

Figure 26:
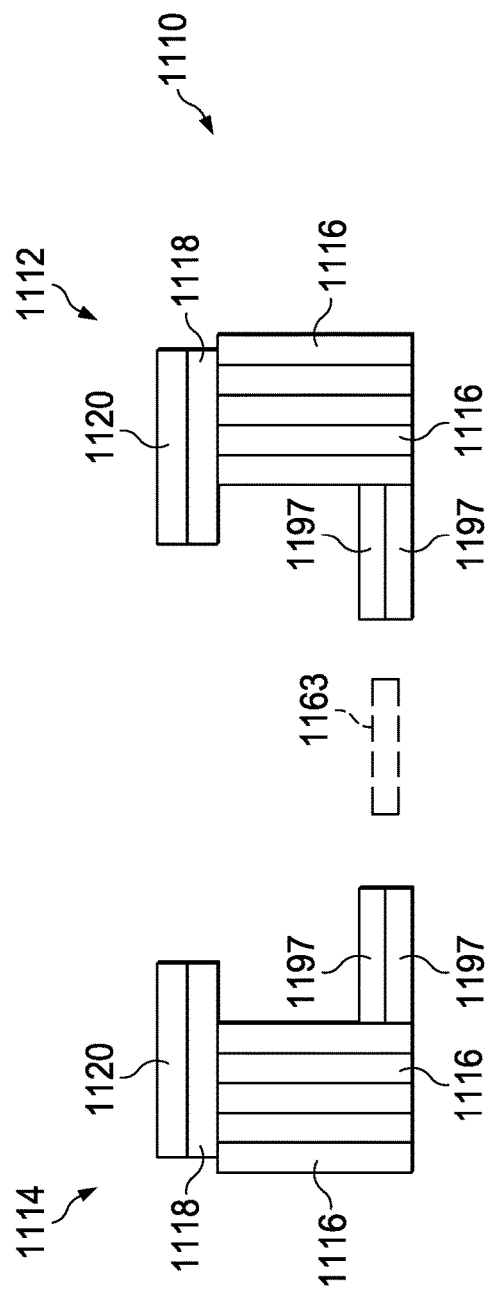
FIG. 26 is a cross-section view depicting a right rail and a left rail of a vertical track portion of a roller coaster track, in accordance with another embodiment.
Figure 27A:
FIGS. 27A-27I are sectional views depicting various alternative track arrangements.
Figure 27B:
Figure 27C:
Figure 27D:
Figure 27E:
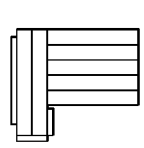
Figure 27F:
Figure 27G:
Figure 27H:
Figure 27I:

FIG. 26 illustrates an alternative embodiment of a vertical track portion 1110 of a roller coaster track that is similar to, or the same in many respects as the vertical track portion 110 illustrated in FIGS. 8 and 9. For example, the vertical track portion 1110 can include a right rail 1112 and a left rail 1114. The right rail 1112 and the left rail 1114 can each include a plurality of base layers 1116, a lower track layer 1118, and an upper track layer 1120. The base layers 1116 can be arranged vertically and the lower and upper tracks 1118, 1120 can overlie the base layers 1116 and can be arranged horizontally. However, a pair of horizontal guide boards 1197 can be laterally adjacent to the base layers 1116. The horizontal guide boards 1197 can be provided along the inside outside of the right rail 1112 and the left rail 1114 such that horizontal guide boards 1197 are disposed between the right rail 1112 and the left rail 1114.

The horizontal guide boards 1197 can be configured (e.g., cut) to define a horizontal component of the curve of the roller coaster track (e.g., similar to the way the horizontal boards 10 described above define a horizontal curve) for the base layers 1116. During assembly of the track, the horizontal guide boards 1197 can be attached first to ledgers (e.g., 151 (not shown)) to serve as a jig for attaching the base layers 1116 thereto. For each of the right and left rails 1112, 1114, an innermost base layer 1116 (e.g., the base layer 1116 most proximate to the opposite rail) can then be butted against the horizontal guide boards 1197 and attached at one end to the ledgers. The innermost base layer 1116 can then be bent in the weak direction (e.g., in the left/right direction) against the horizontal guide board 1197 and attached to the ledgers to impart a horizontal component into the curve. The innermost base layer 1116 and the horizontal guide boards 1197 associated therewith can cooperate to define a cross-sectional L-shape. The rest of the base layers 1116 can then be attached to the innermost base layer 1116 in a similar manner and the lower and upper track layers 1118, 1120 can be attached over the base layers 1116 after that. In one embodiment, the horizontal guide boards 1197 can be removed once the construction of the right and left rails 1112, 1114 is complete. In another embodiment, the horizontal guide boards 1197 can be left in place and a center board 1163 (shown in dashed lines) can be installed between the horizontal guide boards 1197 and can cooperate with the horizontal guide boards 1197 to prevent an installer from falling between the right and left rails 1112, 1114. It is to be appreciated that the horizontal guide boards 1197 can be prefabricated in a similar manner as the base layers 16 of the horizontal track portion 10 described above. It is also to be appreciated that horizontal guide boards 1197 can additionally or alternatively be provided on the outside of the right and left rails 1112, 1114.

Referring now to FIGS. 27A-27I, various alternative track arrangements are illustrated that can be constructed using the principles and method described herein. It is to be appreciated that any variety of suitable alternative layers of a roller coaster track, such as jig boards and center boards, for example, can be prefabricated, constructed/manufactured and assembled according to the principles and methods described herein.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for manufacturing a roller coaster track, the method comprising:
   generating a computer model of a roller coaster track comprising a plurality of segments, the computer model defining parameters of each segment of the plurality of segments of the roller coaster track;
   precutting a first segment from a planar material into a first shape with an automated cutting device based on the parameters defined by the computer model for the first segment;
   precutting a second segment from the planar material into a second shape with the automated cutting device based on the parameters defined by the computer model for the second segment;
   precutting a third segment from the planar material into a third shape with the automated cutting device based on the parameters defined by the computer model for the third segment;
   precutting a fourth segment from the planar material into a fourth shape with the automated cutting device based on the parameters defined by the computer model for the fourth segment;
   constructing a first layer of the roller coaster track with at least the precut first and second segments such that the precut first segment is in a longitudinal contacting relationship with the precut second segment at a first interface location; and
   constructing a second layer of the roller coaster track laterally adjacent to the first layer with at least the precut third and fourth segments such that the precut third segment is in a longitudinal contacting relationship with the precut fourth segment at a second interface location, wherein the first interface location is longitudinally offset from the second interface location, wherein the first layer and the second layer are arranged horizontally.

2. The method of claim 1, wherein the first layer comprises a first base layer and the second layer comprises a second base layer and the method further comprises:
   precutting a fifth segment from the planar material into a fifth shape with the automated cutting device based on the parameters defined by the computer model for the fifth segment;
   precutting a sixth segment from the planar material into a sixth shape with the automated cutting device based on the parameters defined by the computer model for the sixth segment; and
   constructing a track layer of the roller coaster track laterally adjacent to the second base layer with at least the precut fifth and sixth segments such that the precut fifth segment is in a longitudinal contacting relationship with the precut sixth segment at a third interface location, the third interface location being longitudinally offset from the second interface location, wherein the track layer defines a travel path for a train car.

3. The method of claim 2, wherein the track layer is arranged horizontally.

4. The method of claim 2, wherein the first base layer and the second base layer are arranged vertically and the track layer is arranged horizontally.

5. The method of claim 4, wherein at least one of the precut first segment, the precut second segment, the precut third segment, or the precut fourth segment comprises a shoulder feature that is configured to rest upon ledgers of a substructure.

6. The method of claim 2, wherein the track layer, the first base layer, and the second base layer cooperate to form a three-dimensional curve shape.

7. The method of claim 2, wherein the first and second segments of the first layer each comprise first indicia configured to identify an assembled position of the first and second segments of the first layer within the roller coaster track.

8. The method of claim 7, wherein the third and fourth segments of the second layer each comprise second indicia configured to identify an assembled position of the third and fourth segments of the second layer within the roller coaster track.

9. The method of claim 8, wherein the fifth and six segments of the track layer each comprise third indicia configured to identify an assembled position of the fifth and six segments of the track layer within the roller coaster track.

10. The method of claim 9, wherein:
    constructing a first layer of the roller coaster track with at least the precut first and second segments comprises constructing, based on the first indicia, a first layer of the roller coaster track with at least the precut first and second segments such that the precut first segment is in a longitudinal contacting relationship with the precut second segment at a first interface location;
    constructing a second layer of the roller coaster track laterally adjacent to the first layer with at least the precut third and fourth segments comprises constructing, based on the second indicia, a second layer of the roller coaster track laterally adjacent to the first layer with at least the precut third and fourth segments such that the precut third segment is in a longitudinal contacting relationship with the precut fourth segment at a second interface location; and
    constructing a track layer of the roller coaster track laterally adjacent to the second base layer with at least the precut fifth and sixth segments comprises constructing, based on the third indicia, a track layer of the roller coaster track laterally adjacent to the second base layer with at least the precut fifth and sixth segments such that the precut fifth segment is in a longitudinal contacting relationship with the precut sixth segment at a third interface location.

11. The method of claim 1, wherein the first and second segments of the first layer each comprise a first end and a second end opposite the first end;
    wherein the first segment of the first layer comprises a first interlocking member disposed on the second end, and the second segment of the first layer comprises a second a second interlocking member disposed on the first end; and
    wherein constructing a first layer of the roller coaster track with at least the precut first and second segments comprises constructing a first layer of the roller coaster track with at least the precut first and second segments such that the first interlocking member disposed on the second end of the first segment interacts with the second interlocking member disposed on the first end of the second segment at the first interface location.

12. A method for manufacturing a roller coaster track, the method comprising:
   precutting a first segment from a planar material into a first shape with an automated cutting device;
   precutting a second segment from the planar material into a second shape with the automated cutting device;
   precutting a third segment from the planar material into a third shape with the automated cutting device;
   precutting a fourth segment from the planar material into a fourth shape with the automated cutting device;
   constructing a first layer of a roller coaster track with at least the precut first and second segments such that the precut first segment is in a longitudinal contacting relationship with the precut second segment at a first interface location; and
   constructing a second layer of the roller coaster track laterally adjacent to the first layer with at least the precut third and fourth segments such that the precut third segment is in a longitudinal contacting relationship with the precut fourth segment at a second interface location, wherein the first interface location is longitudinally offset from the second interface location, wherein the first layer and the second layer are arranged horizontally.

13. The method of claim 12, wherein the first layer comprises a first base layer and the second layer comprises a second base layer and the method further comprises:
   precutting a fifth segment from the planar material into a fifth shape with the automated cutting device;
   precutting a sixth segment from the planar material into a sixth shape with the automated cutting device; and
   constructing a track layer of the roller coaster track laterally adjacent to the second base layer with at least the precut fifth and sixth segments such that the precut fifth segment is in a longitudinal contacting relationship with the precut sixth segment at a third interface location, the third interface location being longitudinally offset from the second interface location, wherein the track layer defines a travel path for a train car.

14. The method of claim 13, wherein the track layer is arranged horizontally.

15. The method of claim 13, wherein the first base layer and the second base layer are arranged vertically and the track layer is arranged horizontally.

16. The method of claim 13, wherein the track layer, the first base layer, and the second base layer cooperate to form a three-dimensional curve shape.

17. The method of claim 13, wherein the first and second segments of the first layer each comprise first indicia configured to identify an assembled position of the first and second segments of the first layer within the roller coaster track.

18. The method of claim 17, wherein the third and fourth segments of the second layer each comprise second indicia configured to identify an assembled position of the third and fourth segments of the second layer within the roller coaster track.

19. The method of claim 18, wherein the fifth and six segments of the track layer each comprise third indicia configured to identify an assembled position of the fifth and six segments of the track layer within the roller coaster track.

20. The method of claim 19, wherein:
   constructing a first layer of the roller coaster track with at least the precut first and second segments comprises constructing, based on the first indicia, a first layer of the roller coaster track with at least the precut first and second segments such that the precut first segment is in a longitudinal contacting relationship with the precut second segment at a first interface location;
   constructing a second layer of the roller coaster track laterally adjacent to the first layer with at least the precut third and fourth segments comprises constructing, based on the second indicia, a second layer of the roller coaster track laterally adjacent to the first layer with at least the precut third and fourth segments such that the precut third segment is in a longitudinal contacting relationship with the precut fourth segment at a second interface location; and
   constructing a track layer of the roller coaster track laterally adjacent to the second base layer with at least the precut fifth and sixth segments comprises constructing, based on the third indicia, a track layer of the roller coaster track laterally adjacent to the second base layer with at least the precut fifth and sixth segments such that the precut fifth segment is in a longitudinal contacting relationship with the precut sixth segment at a third interface location.

21. The method of claim 12, wherein the first and second segments of the first layer each comprise a first end and a second end opposite the first end;
   wherein the first segment of the first layer comprises a first interlocking member disposed on the second end, and the second segment of the first layer comprises a second a second interlocking member disposed on the first end; and
   wherein constructing a first layer of the roller coaster track with at least the precut first and second segments comprises constructing a first layer of the roller coaster track with at least the precut first and second segments such that the first interlocking member disposed on the second end of the first segment interacts with the second interlocking member disposed on the first end of the second segment at the first interface location.

22. The method of claim 12, further comprising generating a computer model of the first, second, third, and fourth segments, and wherein precutting the first, second, third, and fourth segments into the first, second, third, and fourth shapes comprises precutting the first, second, third, and fourth segments into the first, second, third, and fourth shapes based upon the computer model.

* * * * *